United States Patent
Nishinou et al.

(10) Patent No.: US 6,370,336 B1
(45) Date of Patent: Apr. 9, 2002

(54) AUXILIARY DRIVE SYSTEM FOR RUNNING-IN MOVABLE COMPONENTS

(75) Inventors: Naoyuki Nishinou, Saitama; Yoshio Sugano, Tokyo, both of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/365,171

(22) Filed: Aug. 2, 1999

(30) Foreign Application Priority Data

| Aug. 3, 1998 | (JP) | 10-219057 |
| Sep. 9, 1998 | (JP) | 10-254929 |
| Jul. 21, 1999 | (JP) | 11-205999 |

(51) Int. Cl.[7] ................................. G03B 7/26
(52) U.S. Cl. ................. 396/277; 396/280; 396/463
(58) Field of Search ............. 396/277, 463, 396/483, 303, 231, 280, 471, 221, 449

(56) References Cited

U.S. PATENT DOCUMENTS

| 3,995,458 A | * | 12/1976 | Grunewald et al. | ........... 68/140 |
| 4,190,344 A | * | 2/1980 | Ishiguro et al. | ............. 354/234 |
| 4,389,111 A | * | 6/1983 | Uchidoi et al. | ............. 354/173 |
| 4,400,073 A | | 8/1983 | Tosaka et al. | |
| 4,674,897 A | * | 6/1987 | West et al. | .................. 400/124 |
| 5,414,482 A | | 5/1995 | Iwai et al. | |
| 5,640,625 A | | 6/1997 | Hozumi | |
| 6,031,999 A | * | 2/2000 | Ogawa | ........................ 396/303 |
| 6,167,204 A | * | 12/2000 | Ito | ............................. 396/311 |

FOREIGN PATENT DOCUMENTS

| EP | 0 978 755 | | 2/2000 | |
| JP | 363019638 | * | 1/1988 | ............ G03B/9/10 |

* cited by examiner

Primary Examiner—David M. Gray
(74) Attorney, Agent, or Firm—Young & Thompson

(57) ABSTRACT

An auxiliary drive system controls an actuator to force movable members such as shutter blades of a power-driven shutter system to cause predetermined movement so as thereby to run in the movable members when the the power-driven apparatus is loaded with a battery as a power source, when the power-driven apparatus is powered on or when a predetermined time has passed since the last operation of the movable members.

23 Claims, 15 Drawing Sheets

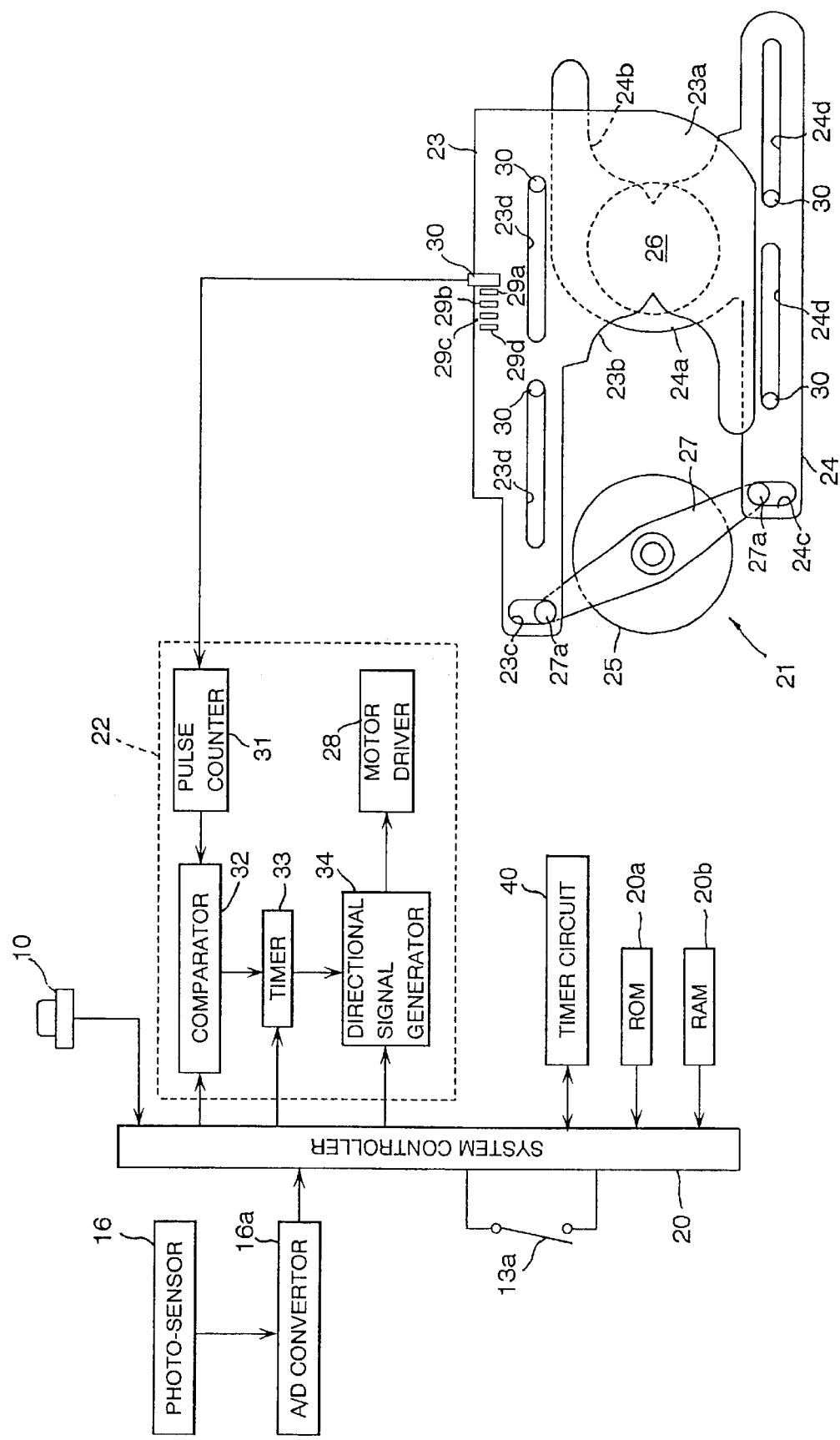

AUXILIARY DRIVE SYSTEM FOR RUNNING-IN MOVABLE COMPONENTS

BACKGROUND OF THE INVENTION

1. Field of the Invention

The invention relates to an auxiliary drive system for a power-driven apparatus, such as a power-driven shutter mechanism, having an actuator and movable members driven by the actuator, and, more particularly, to an auxiliary drive system for running in a power-driven apparatus which is used after it has been left dormant for a long period of time.

2. Description of Related Art

Typically, photographic cameras are equipped with shutter mechanisms which includes shutter blades operative to open and close to control an exposure time. Some types of cameras, such as compact cameras and instant cameras, are equipped with programmed shutter mechanisms in which aperture blades are operative for both diaphragm and shutter. For example, a programmed shutter mechanism, on which both the shutter speed and F-number are set automatically according to the brightness of a subject to be shot, typically has more-than-two shutter blades which are opened and closed all at once by an actuator such as a motor and a solenoid. In this programmed shutter mechanism a shutter speed or a time interval for which the shutter blades remain open is determined according to an exposure value and a size of the aperture, which corresponds to F-number, depends upon shutter speeds.

By the way, the shutter mechanism may behave precariously due to a change in the coefficient of friction among the shutter blades, a change in the coefficient of friction of mechanical parts or members of a shutter drive mechanism, a change in viscosity of a lubricant of the shutter blades when operating the camera after having left it dormant for a long period of time. In such the case, the shutter speed of the shutter mechanism or both the shutter speed and aperture of the programmed shutter mechanism will be imprecise, which causes under or over exposure. The same problem occus in various mechanisms equipped with movable members like shutter blades. For example, a camera equipped with an automatic focusing feature encounters difficulties in smooth movement of a focusing lens element of the taking lens with an effect of loosing the chance to losing the chance to shoot a subject due to a delay in operation of the shutter blades which should occur after conclusion of focusing the taking lens or an effect of forming an out-focused picture. Further, a printer equipped with a paper feed roller or rollers encounters an occurrence of an imprecise image printed on a paper due to an uneven feed speed if irregular rotation of the paper feed rollers is caused.

SUMMARY OF THE INVENTION

It is therefore an object of the invention to provide an auxiliary drive system for a power-driven apparatus having movable members which prevents the movable members from encountering unstable movement.

According to one aspect of the invention, the auxiliary drive system for a power-driven apparatus having an actuator and movable members driven by the actuator comprises control means for controlling the actuator to force the movable members to cause predetermined movement along a fixed axial distance so as thereby to run in the movable members in response to either loading the power-driven apparatus with a battery as a power source or powering on the power-driven apparatus.

According to another aspect of the invention, the auxiliary drive system for a power-driven apparatus having an actuator and movable members driven by the actuator comprises timer means for counting a time since the last movement of the movable members and control means for controlling the actuator to force the movable members to cause predetermined movement so as thereby to run in the movable members when the timer has counted a predetermined time since the last movement of the movable members.

According to an preferred embodiment, the control means may control the actuator to force the movable members to cause the predetermined movement for running-in operation of the movable members in response to loading the power-driven apparatus with a battery or batteries as the power source. Further, the control means may further control the actuator to force the movable members to cause the predetermined movement for running-in operation of the movable members in response to powering on the power-driven apparatus. The control means may permit the actuator to force the movable members to cause the predetermined movement for running-in operation of the movable members only while the power-driven apparatus is powered with battery power higher than a predetermined level.

According to another aspect of the invention, the auxiliary drive system is employed as one for a power-driven shutter system, such as a programmed shutter, as the power-driven apparatus which comprises a pulse motor and a shutter blade or blades driven by the pulse motor in response to shutter release to make exposure on a photographic film while the shutter blades move from an initial position to a position beyond an opening position in which the shutter blades are on point of starting the exposure and return to the initial position. The control means controls the pulse motor to force the shutter blades to cause predetermined back and forth movement between the initial position and a position before the opening position so as thereby to run in the shutter blades. The pulse motor may be desirably operated with a lower kinetic energy during running-in operation of the shutter blade than during exposure operation of the shutter blades.

With the auxiliary drive system of the invention, because the running-in operation between the fixed axial positions of the movable member is performed in response to powering on either the power-driven apparatus having a movable member driven by the actuator or the machine equipped with the power-driven apparatus, to a lapse of a predetermined period of time since the last movement of the movable member, or to loading either the power-driven apparatus or the machine equipped with the power-driven apparatus with a battery or batteries, the given coefficient of friction between the movable members and the given condition of lubrication are favorably maintained even after the power-driven apparatus has been left dormant or suspended with the result of having the power-driven apparatus operate stably.

BRIEF DESCRIPTION OF THE DRAWINGS

The accompanying drawings, which are incorporated in and construe member of the specification, illustrate the preferred embodiments of the invention. In the drawings members or mechanisms denoted by the same or like reference numerals are same in structure and operation. It is to be understood, of course, that both drawings and the description are explanatory only and are not restrictive of the invention.

FIG. 2 is a block diagram showing an essential structure of the instant camera according to an preferred embodiment of the invention;

FIG. 6 is a flow chart illustrating a variation of the sequential subroutine of shutter operation control shown in FIG. 4 in which running-in operation is performed while a main switch remains on;

FIG. 7 is a flow chart illustrating another variation of the camera operation control main routing shown in FIG. 4 in which running-in operation is performed every time the main switch is turned on;

FIG. 9 is a time chart of running-in operation of the shutter blades between the initial position and a position before the opening position while the main switch remains on;

FIG. 15 is a flow chart illustrating a variation of the camera operation control main routine shown in FIG. 13 in which running-in operation is performed while a main switch remains on.

DETAILED DESCRIPTION OF THE PREFERRED EMBODIMENTS

Figure 1:
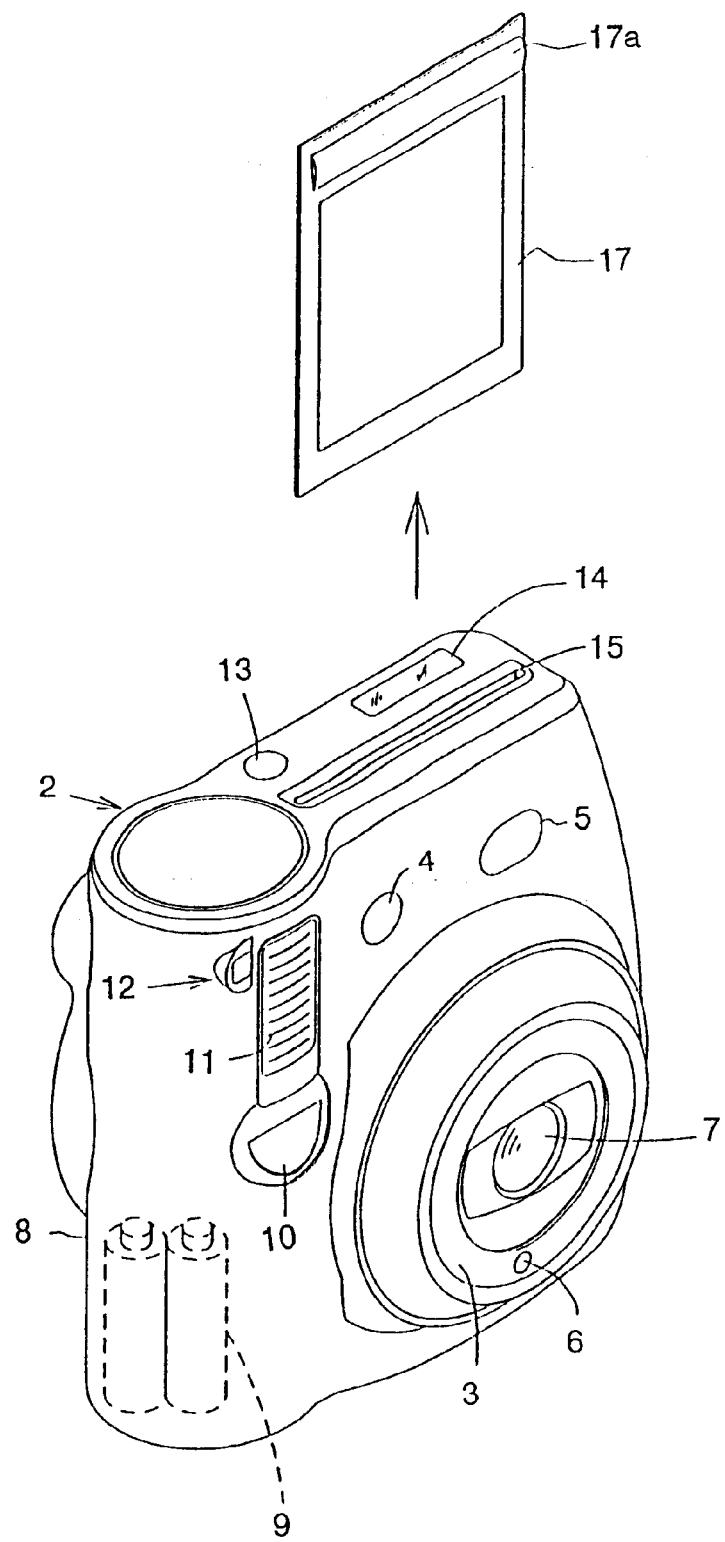
FIG. 1 is a perspective view of an instant camera equipped with an auxiliary drive system of the invention.

Referring to the accompanying drawings in detail and, in particular, to FIG. 1 which shows an instant camera equipped with an auxiliary shutter drive system of the invention, a camera body 2 of the instant camera is formed with a grip 8 as integral part thereof. The instant camera is equipped with a taking lens 7 in a collapsible lens barrel 3, a range finding system including a light projection window 4 and a light reception window 5, a light metering system including a light metering window 6, which are installed to or formed in the front wall of the camera body 2, and a main switch button 13 and an liquid crystal display (LCD) 14, which are installed to the top wall of the camera body 2. The LCD 14 which is driven to display data necessary for exposure. The camera body 2 has an ejection slot 15 formed in the top wall through which a developed instant film unit 17 is ejected out. The grip 8 is provided with a shutter release button 10, a built-in automatic flash 11 and a finder system 12 installed to the front section thereof and batteries 9 installed therein. All electric parts and mechanisms of the instant camera are powered with electric power from the batteries 9. The main switch button 13 is operative to power on and off the instant camera. Whenever the main switch button 13 is pushed, a main switch 13a (see FIG. 2) is alternately turned on or off. The lens barrel 3 is protruded and put ready for focusing following turning on the main switch 13a, and retracted into the camera body 2 following turning off the main switch 13a. While the main switch 13a remains turned off, even if the shutter release button 10 is pushed, no operation of the exposure mechanism including the shutter occurs.

In the inside of the camera body 2 there are provided a photo-sensor 16 (see FIG. 2) disposed behind the light metering window 6 and a range finding system which includes an element disposed behind the light projection window 4 for projecting an infrared beam toward a subject through the light projection window 4 and an infrared photo-sensor disposed behind the light reception window 5 for receiving an infrared beam reflected by the subject. These light metering system and range finding system are well known in various forms in the photographic art and may take any known forms. When pushing the shutter release button 10, exposure of an instant film unit 17 is made following achievement of adjusting the focus of the taking lens 7 on the subject by the range finding system and detection of the brightness of the subject by the light metering system. The exposure is performed by driving the shutter based on the brightness of the subject which is detected based on an output from the photo-sensor 16.

The camera body 2 at its back has a film pack receiving chamber (not shown) for receiving a film pack in which a stuck of mono-sheet type of instant film units 17 is loaded. Every time the shutter release button 10 is pushed, the foremost instant film unit 17 is exposed and automatically ejected through the ejection slot 15. Specifically, the exposed instant film unit 17 is forced to advance between a pair of processing rollers disposed immediately before the ejection slot 15. As the exposed instant film unit 17 is advanced, the processing roller pressure ruptures the pod of jelly like developer 17a at the top of the film unit 17 and spreads the developer in an even layer between the face-to-face sheets. The automatic self-processing is completed so that a finished print is available for viewing in seconds or minutes.

Referring to FIG. 2 showing a programmed type of shutter system of the instant camera, the shutter system comprises two main units, namely a shutter mechanism unit 21 and a shutter drive control electric unit 22, which are controlled in ordinary exposure operation and running-in operation by a system controller 20. The shutter mechanism unit 21 comprises a pair of shutter blades 23 and 24 and a reversible pulse motor 25 working as a shutter actuator. The pulse motor 25 is controlled in rotational direction and angle to drive the shutter blades 23 and 24 so as to determine the size of an exposure aperture 26 positioned behind the taking lens 7 and an exposure time according to subject brightness. The shutter blades 23 and 24, which overlap with each other so as to completely shut the exposure aperture 26 in an initial or rest position shown in FIG. 2, are movable in opposite directions, namely an opening direction and a closing direction. The shutter blade 23 has a sector section 23a formed with a generally V-shaped cut-out 23b by which the exposure aperture 26 is closed in the rest position. Similarly the shutter blade 24 has a sector section 24a formed with a generally V-shaped cut-out 24b by which the exposure aperture 26 is closed in the rest position. In the opening direction the shutter blade 23 and the shutter blade 24 move to the right and the left, respectively, as viewed in FIG. 2. In the extreme open position the shutter blades 23 and 24 completely open the exposure aperture 26 between their V-shaped cut-outs 23b and 24b. The shutter blade 23 at its one end is formed with a vertical link slot 23c which receives a link pin 27a secured to one of opposite ends of a rotary arm 27 of the pulse motor 25 therein and longitudinal guide slots 23d which receive guide pins 30 secured to part of the camera body 2 for substantially horizontal slide movement therein, and the shutter blade 24 at its one end is formed with a link slot 24c which receives a link pin 27a secured to another end of the rotary arm 27 of the pulse motor 25 therein and longitudinal guide slots 24d which receive guide pins 30 secured to part of the camera body 2 for substantially horizontal slide movement therein. By means of the link mechanism, rotation of the pulse motor 25 causes slide movement of the shutter blades 23 and 24 in opposite opening directions. The rotary arm 27 turns clockwise to force the shutter blades 23 and 24 in the opposite opening directions, respectively, when the pulse motor 25 rotates forward. With movement in the opposite opening directions, the shutter blades 23 and 24 increases an aperture formed between their V-shaped cut-outs 23b and 24b in size, i.e. an opened area of the exposure aperture 26. To the contrary, the rotary arm 27 turns counterclockwise to force the shutter blades 23 and 24 in the opposite closing directions, respectively, until completely closing the exposure aperture 26 when the pulse motor 25 is reversed.

The system controller 20 is equipped with ROM 20a for storing various programs and data necessary for sequential camera operation and running-in operation of the shutter mechanism and RAM 20b as a work memory for impermanently storing various data and parameters necessary for exposure and processing. Upon reception of a release signal generated by pushing the shutter release button 10, the system controller 20 starts sequential exposure operation including light metering, automatic focusing and exposure of a film unit 17 according to the program, and subsequently performs ejection and processing of the film unit 17. Specifically, the light metering system including the photosensor 16 starts metering brightness of a subject in response to reception of the release signal by the system controller 20 and provides a photo-electric signal representative of the brightness of the subject. The brightness signal is transformed into brightness data in A/D converter 16a and then transmitted to the system controller 20. An exposure value EV is determined based on the brightness of a subject and the film speed of the film unit 17 in the system controller 20. A data table in ROM 20a is referred to transform the exposure value EV to an exposure time interval $T_{EV}$ for which the shutter is forced to remain open. The time interval T is set in the shutter drive control electric unit 22. The time interval T is defined as a time from a point of time at which the shutter blade 23 slides in the opening direction and reaches a fixed position where the shutter blades 23 and 24 are on point of starting to develop an aperture between their V-shaped cut-outs 23b and 24b (which is hereafter referred to as an opening position) to a point of time at which a return signal with which the shutter blade 23 starts its return slide movement is generated. On the exposure value control the shutter speed and aperture are adjusted by counting the time interval T from a point of time at which the shutter blade 23 reaches the opening position. It is of course that the time interval T is determined in consideration of a time delay until the shutter blades 23 and 24 actually start their return slide movement from an appearance of a return signal.

The pulse motor 25 is controlled by the shutter drive control electric unit 22, in particular a motor drive circuit 28, such that it starts forward rotation to cause slide movement of the shutter blades 23 and 24 in the opposite opening directions, respectively, and is reversed to cause return slide movement of the shutter blades 23 and 24 in the opposite closing directions, respectively when the time interval T from a point of time at which the shutter blade 23 reaches the opening position is counted up. In order to detect arrival to the opening position of the shutter blade 23, there is provided with a position sensor, such as a photo-interrupter 30 comprising a light emitting element and a photo-electric element disposed on opposite sides of the shutter blade 23, fixedly installed in the camera body 2 and a plurality of, for example four in this embodiment, slots 29a–29d formed and arranged at regular intervals in a longitudinal direction in the shutter blade 23. The photo-interrupter 30 provides an encode signal at a low (L) level while it is out of alignment with the slots 29a–29d or at a high (L) level when in alignment with any one of the slots 29a–29d. Accordingly, the encode signal alternatively changes between the H and the L level during slide movement in the opening direction of the shutter blade 23. The last slit 29d is located relative to the V-shaped cut-out 23b such that it is brought into alignment with the photo-interrupter 30 when the shutter blades 23 and 24 are on point of starting to develop an aperture between their V-shaped cut-outs 23b and 24b, i.e. when exposure is actually started.

The shutter drive control electric unit 22 includes a pulse counter circuit 31, a comparator circuit 32, a timer circuit 33, and a directional signal generator circuit 34 in addition to the motor drive circuit 28. The pulse counter circuit 31 counts encode pulses which is parts of the encode signal at the H level. The number of encode pulses P counted by the pulse counter circuit 31 is examined whether it agrees with a threshold number of encode pulses Pr set in the comparator circuit 32. The pulse counter circuit 31 is reset to zero by the system controller 20 immediately before the shutter is actuated. When the pulse counter circuit 31 counts up the threshold number of encode pulses Pr, the comparator circuit 32 instantaneously provides a trigger signal with which the timer circuit 33 is actuated to count time. At the moment of counting up the time interval T, the timer circuit 33 provides a reversal signal. The timer circuit 33 is reset to zero by the system controller 20 immediately before the shutter is actuated. The directional signal generator circuit 34 provides the motor drive circuit 28 with a directional signal at a high (H) level when receiving a forward signal from the system controller 20 or at a directional signal at a low (L) level when receiving a reversal signal from the timer circuit 33. The motor drive circuit 28 causes the pulse motor 25 to rotate in the forward direction at a fixed speed when receiving the directional signal at the H level or reverses it to rotate in the reverse direction at a fixed speed when receiving the directional signal at the L level. In response to a return to the closed position of the shutter blades 23 and 24 which is detected by means of a position sensor (not shown) the pulse motor 25 is stopped.

The opening position is located where the shutter blade 23 is positioned when the photo-interrupter 30 is brought into alignment with the last or fourth slit 29d. In other words, for the opening position of the shutter blade 23, the exposure value EV takes "0," and the threshold number of encode pulses Pr set in the comparator circuit 32 is "4" (which is the number of slits of the position sensor) in this embodiment.

Therefore, the timer circuit 33 starts to count time when the photo-interrupter 30 is brought into alignment with the fourth slit 29d as a result of slide movement to the opening position of the shutter blades 23 and 24 and provides the directional signal generator circuit 34 with a reversal signal when counting up the time interval T with an effect of causing the directional signal generator circuit 34 to provide the motor drive circuit 28 with a directional signal at the L level and reverse the pulse motor 25. As described above the exposure value EV is controlled by controlling the time interval T for which the shutter is open.

If the instant camera is left dormant or suspended for a long period of time, the shutter mechanism unit 21 encounters unstable actions with an effect of imprecisely controlling the time interval T, i.e. the exposure value EV, when it is used for the first time after a long dormancy. An occurrence of unstable action of the shutter mechanism unit 21 is prevented by running the shutter mechanism unit 21 in when a threshold dormant or suspended time Dr from the latest use of the instant camera is detected. The threshold suspended time Dr is ten days in this embodiment and may be appropriately changed. An auxiliary shutter drive system, which comprises the system controller 20 and a timer circuit 40, performs the running-in operation of the shutter mechanism unit 21 by controlling rotation of the pulse motor 25 such that the shutter blades 23 and 24 are slid between the rest position and the opening position only. Specifically, in the running-in operation of the shutter mechanism unit 21, the system controller 20 provides the directional signal generator circuit 34 with a reversal signal when the photo-interrupter 30 is brought into alignment with a specific one of the slits 29a–29d, the third-from-right slit 29c in this embodiment, so as to reverse the pulse motor 25, i.e. immediately before the shutter blades 23 and 24 reach a position where they are on point of starting to develop an aperture between their V-shaped cut-outs 23b and 24b. For the running-in operation of the shutter blade 23, the system controller 20 sets an exposure time interval TEV of zero (0) in the timer circuit 33, and a threshold number of encode pulses Pr of "3" in the comparator circuit 32 in this embodiment. Therefore, the timer circuit 33 provides the directional signal generator circuit 34 with a reversal signal in response to counting up the threshold number of encode pulses Pr, i.e. three encode pulses, by the pulse counter circuit 31. This is because the exposure time interval TEV, which is zero (0), is counted up in an instant by the timer circuit 33 when three encode pulses are counted by the pulse counter circuit 31. The reciprocating slide movement of the shutter blades 23 and 24 is preferably repeated plural, for example five, times so as to enhance a running-in effect. The specific slit, on which a timming for providing a reversal signal depends, is chosen in consideration of a time delay caused until the shutter blades 23 and 24 actually start to slide in the opposite closing directions from an apperance. of the reversal signal due to the responsiveness of the pulse motor and/or inertia of the rotary arm 27 of the pulse motor 25 and the shutter blades 23 and 24. Further, the specific slit is chosen in consideration of an increase in slide movement of the shutter blades 23 and 24 after an appearance of the reversal signal due to a drop in resistance of mechanical members of the shutter mechanism unit 21 such that the shutter blades 23 and 24 start to return in the opposite closing directions immediately before they develop an aperture between their V-shaped cut-outs 23b and 24b. The system controller 20, the timer circuit 40 and the shutter mechanism unit 21 always remain powered on by the batteries 9 and are alive in spite of operation of the main switch 13a.

The counter circuit 40 counts a dormant or suspended time D since the latest use of the instant camera and is reset to zero at every exposure and at every running-in operation. The system controller 20 compares the suspended time D counted by the timer circuit 40 with the threshold suspended time Dr and performs the running-in operation when the threshold suspended time D is exceeded. The system controller 20 is designed and adapted to perform the running-in operation of the shutter mechanism unit 21 when the instant camera is loaded with batteries 9. An indication that the shutter system is under running-in operation may be shown on the LCD 14.

Figure 3A:
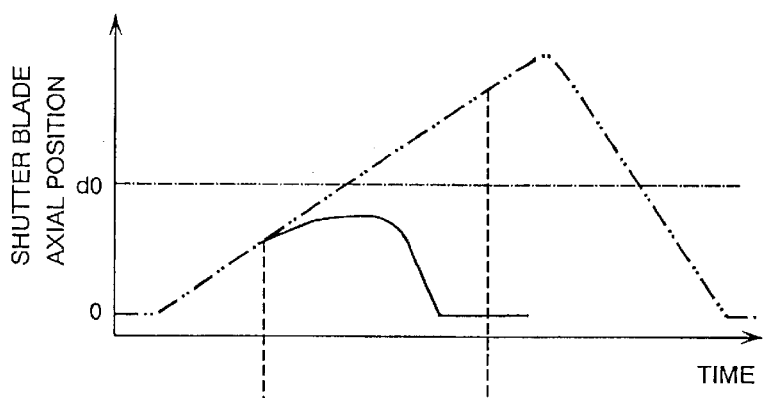
FIGS. 3A–3C are time charts of various signals for controlling movement of shutter blades.
Figure 3B:
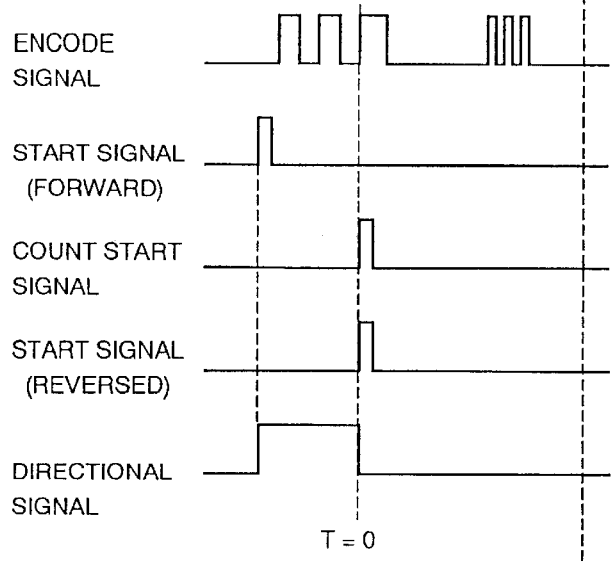
Figure 3C:
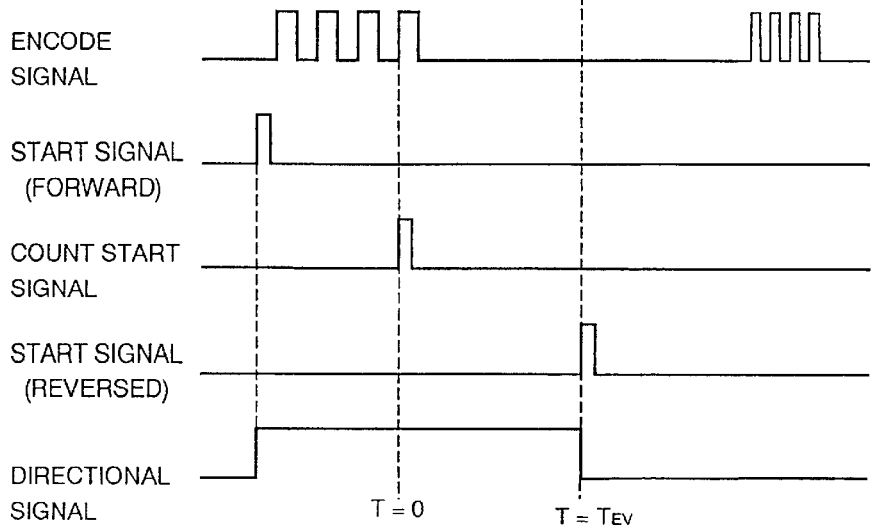
Figure 4:
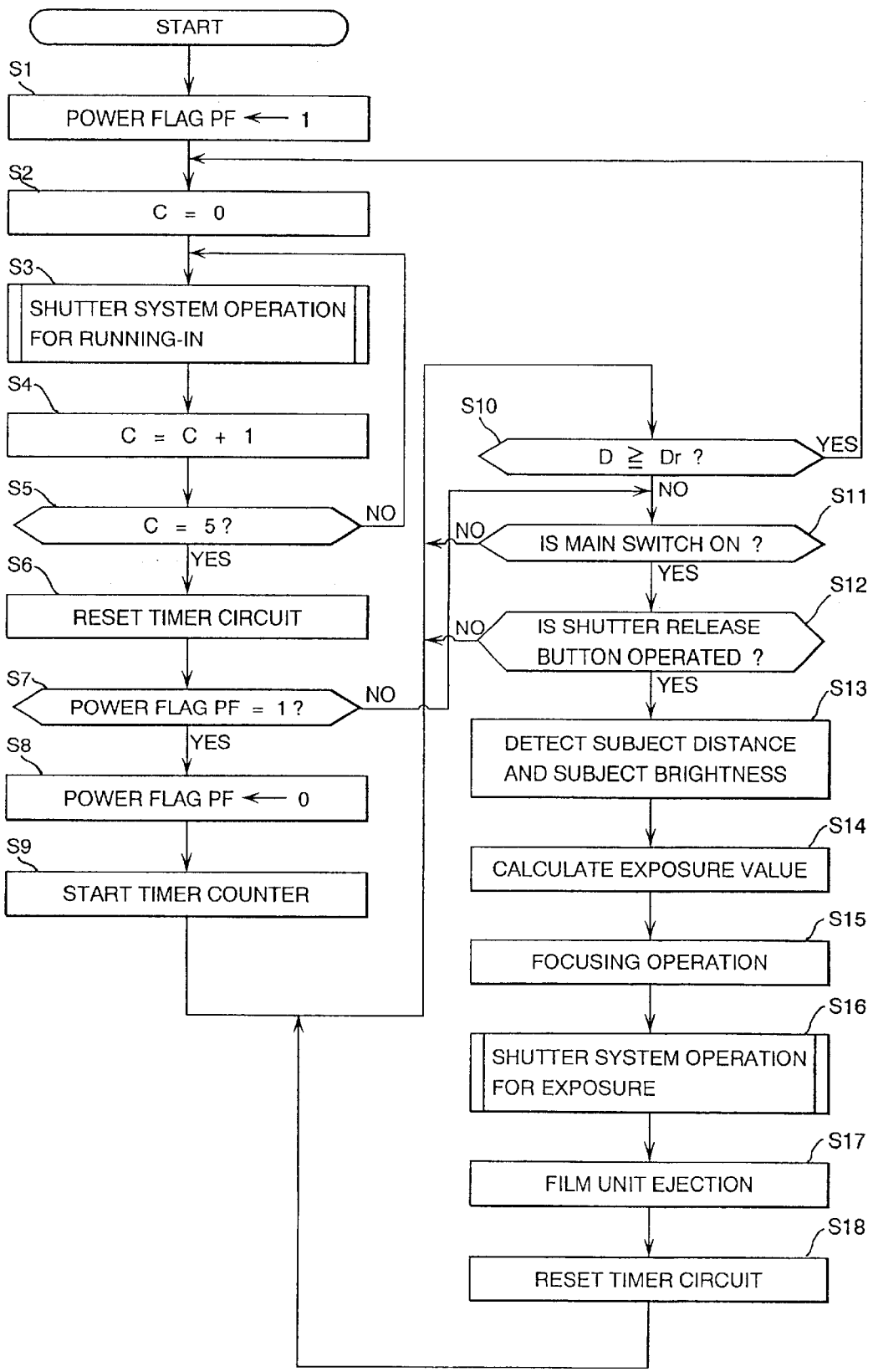
FIG. 4 is a flow chart illustrating a main sequential routine of camera operation control from loading batteries to making exposure.
Figure 5:
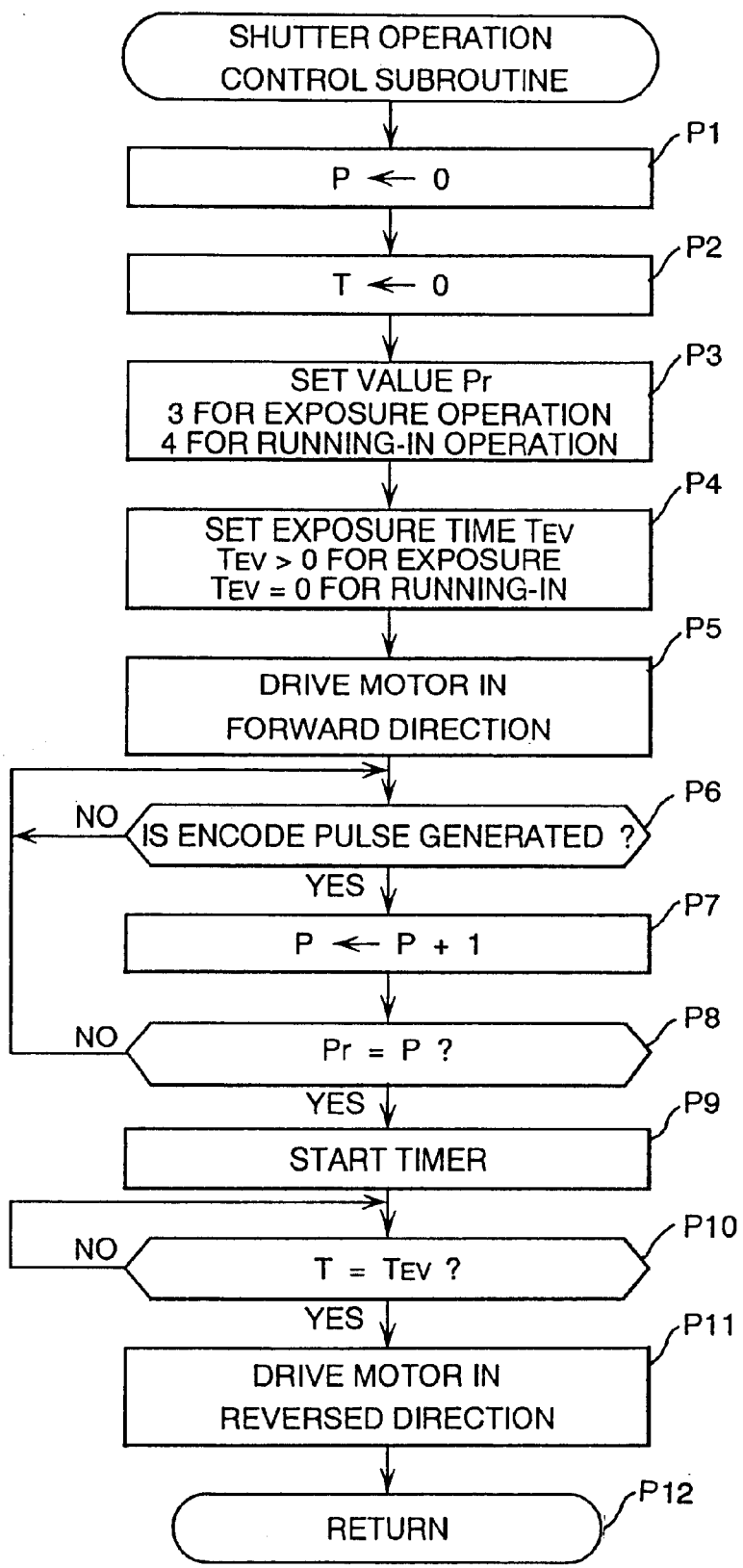
FIG. 5 is a flow chart illustrating a sequential subroutine of shutter operation control for both running-in operation and exposure operation.

Reference is made of FIGS. 3–5 to give a description of operation of the instant camera equipped with the auxiliary shutter drive system of the invention. In FIG. 3, a solid line and a double dotted line indicate slide movement of the shutter blades 23 and 24 with respect to time passage during running-in operation and during ordinary exposure, respectively. The origin (O) is the rest position of the shutter blades 23 and 24, and the opening position where the shutter blades 23 and 24 are on point of starting to develop an aperture between their V-shaped cut-outs 23b and 24b is at a distance d0 from the rest position. FIGS. 3B shows various signals with respect to time passage during running-in operation, and FIGS. 3C shows various signals with respect to time passage during ordinary exposure. When the instant camera is loaded with batteries 9, it is powered on. The system controller 20 performs a main sequential routine of camera operation control illustrated by a flow chart in FIG. 4.

Referring to FIG. 4, when the camera operation control main sequential routine commences and control proceeds to a block at step S1 where a power flag PF is up or set to a state of "1" which indicates the system controller 20 is placed under power supply condition for operation. Subsequently, after resetting the variable C indicative of the number of times of repetition of the running-in operation to zero (0) at step S2, a shutter drive sequential subroutine is called for at step S3 to perform the running-in operation of the shutter system.

Referring now to FIG. 5, which is a flow chart of the shutter drive sequential subroutine, after controlling the pulse counter circuit 31 and the timer circuit 33 to reset their counts P and T to zero at steps P1 and P2, respectively, control proceeds to a block at step P3 where the system controller 20 sets "3" for the threshold number of encode pulses Pr therein, and then to a block at step P4 where the system controller 20 sets a time interval of "0" for the exposure value EV of "0" therein. At this time the comparator circuit 32 receives a number of encode pulses P (which is presently zero) from the pulse counter circuit 31 and compares it with the threshold number of encode pulses Pr. At step P5, the system controller 20 provides the directional signal generator circuit 34 with a forward signal so that the directional signal generator circuit 34 provides the pulse motor 25 with an H level directional signal. As a result, the motor drive circuit 28 provides normal phase drive pulses with which the pulse motor 25 is rotated forward at a fixed speed to turn the rotary arm 27 in the clockwise direction as viewed in FIG. 2, so as to cause slide movement in the opposite opening directions of the shutter blades 23 and 24, respectively, from the rest position. During the slide movement of the shutter blades 23 and 24, the photo-interrupter 30 is approached by the slits 29a–29d. When the photo-interrupter 30 detects the first slit 29a, it provides an encode pulse which is counted by the pulse counter circuit 31. Then, a judgement is made at step P6 as to whether there is provided an encode pulse. When the answer is affirmative or "YES," then, after changing the number of encode pulses P by an increment of one at step P7, another judgement is made in the comparator circuit 32 at step PB as to whether the counted number of encode pulses P agrees with the threshold number of encode pulses Pr which is "3" in this embodiment. The judgement is repeated at step P6 until an encode pulse is provided. On the other hand, when the answer to the judgement made at step P8 is negative while there is provided an encode pulse, the process from step P6 to step P8 is repeated until the counted number of encode pulses P becomes in agreement with the threshold number of encode pulses Pr, i.e. until the photo-interrupter 30 detects the third slit 29c and the pulse counter circuit 31 counts three encode pulses. Upon an occurrence of agreement between the counted number of encode pulses P and the threshold number of encode pulses Pr, the comparator circuit 32 provides a trigger signal to actuate the timer circuit 33 to start counting time at step P9. Subsequently, a judgement is made at step P10 as to whether the timer circuit 33 has counted up the exposure time interval TEV. Because the exposure time interval TEV is zero (0), the answer to the judgement is always affirmative when the trigger signal is provided. When the answer to the judgement is affirmative, then, the timer circuit 33 provides a reversal signal with which the directional signal generator circuit 34 is caused to provide the motor drive circuit 28 with the L level directional signal. As a result, the motor drive circuit 28 provides reversed phase drive pulses with which the pulse motor 25 is reversed at a fixed speed to turn the rotary arm 27 in the counterclockwise direction as viewed in FIG. 2, so as to cause slide movement in the opposite closing directions of the shutter blades 23 and 24, respectively, to the rest position at step P11. When the shutter blades 23 and 24 return to the rest position, the pulse motor 25 stops. Although the shutter blades 23 and 24 are changed in direction of slide movement with a time delay from an appearance of the reversal signal, the timer circuit 33 is designed and adapted to provide the reversal signal at such a timing that the shutter blades 23 and 24 do not develop an aperture between their V-shaped cut-outs 23b and 24b even if there is a time delay in starting slide movement in the opposite closing directions of the shutter blades 23 and 24. Therefore, as shown by the solid line in FIG. 3A, the shutter blades 23 and 24 start to return toward the rest position before reaching the opening position at the distance d0 from the rest position. Then, the final step P12 orders return to the main routine, after the step in the main routine calling for the shutter drive sequential subroutine for running-in operation of the shutter system.

In the main routine of FIG. 4, after changing the variable C by an increment of one at step S4, a judgement is made at step S5 as to whether the running-in operation of the shutter system has been repeated five times, i.e. whether the variable C is "5" which is set as the maximum number of times of repetition of the running-in operation of the shutter system in the system controller 20. The process from step S3 to step S5 is repeated until the running-in operation of the shutter system is repeated five times. As a result, immediately after loading batteries 9, the shutter system is run in five times without making exposure of the foremost film unit 17 in the instant camera. Subsequently, after resetting the timer circuit 40 to zero (0) at step S6, a judgement is made at step S7 as to whether the running-in operation of the shutter system has been performed immediately after powering the system controller 20 on. This judgement is made based on whether the power flag PF is up. At this time, the power flag PF remain up, then, after resetting the power flag PF to a state of "0" at step S8, the timer circuit 40 is actuated to start counting suspended time D since the running-in operation of the shutter system after battery loading at step S9. Subsequently, the system controller 20 compares a counted suspended time D with the threshold suspended time Dr at step S10. When the counted suspended time D is equal to or greater than the threshold suspended time Dr, the running-in operation of the shutter system is performed through steps S2–S9. In the case where it is immediately after the batteries 9 are loaded in the instant camera, that is, when the counted suspended time D is less than the threshold suspended time Dr, or when it is determined at step S7 that the power flag PF is down, this indicates that the running-in operation of the shutter system has been performed immediately after powering the system controller 20 on, a judgement is made at step S11 as to whether the main switch 13a is on. The judgement concerning the counted suspended time D is repeated until the main switch button 13 is pushed with the result of turning the main switch 13a on. Once the main switch button 13, and hence the main switch 13a, is turned on, the lens barrel 3 is protruded in position to put the taking lens 7 ready for focusing, then, a judgement is made at step S12 as to whether the shutter release button 10 is pushed. Until the shutter release button 10 is pushed, the judgements are repeatedly made at steps S10–S12. When the shutter release button 10 is pushed while the main switch 13a remains on, a subject distance and a subject brightness are detected at step S13. The system controller 20 calculates an exposure value EV based on data of the subject brightness transferred thereto from the photo-sensor 16 through the A/D converter 16a at step S14. Specifically, the system controller 20 refers the data table in ROM 20a to transform the subject brightness data into an exposure time interval TEV which is greater than zero. At the same time, the lens barrel 3 is adjusted to focus the taking lens 7 on the intended subject according to the subject distance at step S15. Subsequently, at step S16, the shutter drive sequential subroutine shown in FIG. 5 is called for to perform exposure operation of the shutter system.

Returning to FIG. 5, as was previously described, after resetting the pulse counter circuit 31 and the timer circuit 33 to change their counts P and T to zero at step P1 and P2, respectively, the system controller 20 sets the threshold number of encode pulses Pr to "4" at step P3, and the exposure time interval TEV at step P4. Subsequently, the system controller 20 provides the signal generator circuit 34 with a forward signal so that the directional signal generator circuit 34 provides the pulse motor 25 with the H level directional signal at step P5. As a result, the motor drive circuit 28 provides normal phase drive pulses with which the pulse motor 25 is rotated forward at a fixed speed to turn the rotary arm 27 in the clockwise direction, so as to cause slide movement in the opposite opening directions of the shutter blades 23 and 24, respectively, from the rest position so as to expose the foremost film unit 17 in the instant camera. During the slide movement of the shutter blades 23 and 24, the photo-interrupter 30 detects the slits 29a–29d one after another and provides encode pulses. Whenever, an encode pulse is detected at step P6, the encode pulses P are counted one by one at step P7. When the counted number of encode pulses P agrees with the threshold number of encode pulses Pr which is "4" in this event at step P8, the comparator circuit 32 provides a trigger signal to actuate the timer circuit 33 to start counting time at step P9. Subsequently, after waiting a lapse of the exposure time interval TEV at step P10, the timer circuit 33 provides a reversal signal with which the directional signal generator circuit 34 is caused to provide the motor drive circuit 28 with the L level directional signal. As a result, the motor drive circuit 28 provides reversed phase drive pulses with which the pulse motor 25 is reversed at a fixed speed to turn the rotary arm 27 in the counterclockwise direction, so as to cause slide movement in the opposite closing directions of the shutter blades 23 and 24, respectively, to the rest position at step P11. When the shutter blades 23 and 24 return to the rest position, the pulse motor 25 stops to conclude the exposure of the foremost film unit 17. Then, the final step orders return to the main routine of FIG. 4, after the step in the main routine calling for the shutter drive sequential subroutine. In the main routine, the exposed instant film unit 17 is automatically advanced between the processing rollers and ejected out of the instant camera at step S17. The processing roller pressure ruptures the pod of developer 17a of the film unit 17 and spreads the developer in an even layer between the face-to-face sheets. The automatic self-processing is completed so that a finished print is available for viewing in seconds or minutes. Finally, after ejecting the exposed film unit 17 out of the instant camera, the system controller 20 causes the timer circuit 40 to reset the counts as a suspended time D to zero (0) and then to restart counting a suspended time D in spite of operation of the main switch 13a from since the shutter blades 23 and 24 return to the rest position at step S18. The system controller 20 repeats steps S10 through S18 as long as the counted suspended time D is less than the threshold suspended time Dr at step S10. Whenever the counted suspended time D becomes equal to or greater than the threshold suspended time Dr, the shutter drive sequential subroutine is called for to perform running-in operation of the shutter system in spite of operation of the main switch 13a.

Specifically, in any event where there is a lapse of the threshold suspended time Dr which is 10 days in this embodiment after loading batteries 9 in the instant camera or after the last exposure operation of the shutter system, or where there is a lapse of the threshold suspended time Dr after execution of the running-in operation of the shutter system exclusive of those performed immediately after loading batteries 9 but before exposure operation of the shutter system as described later. In other words, the running-in operation of the shutter system is always performed in spite of operation of the main switch 13a at a lapse of the threshold suspended time Dr from a point of time of the latest occurrence of slide movement of the shutter blades 23 and 24 for running-in or exposure. For example, at a lapse of the threshold suspended time Dr after the latest exposure, the answer to the judgement made at step S10 is affirmative, then, the system controller 20 resets the variable C indicative of the number of times of repetition of the running-in operation to zero (0) and performs the running-in operation of the shutter system five times. After completion of five times of the running-in operation of the shutter system, the system controller 20 causes the timer circuit 40 to reset its count as a suspended time D to zero (0) and then to restart counting suspended time D since the completion of five times of the running-in operation of the shutter system. When the power flag PF is down or has been set to the state of "0," the system controller 20 determines that the instant camera is not in the state immediately after loading the batteries 9, then, following the judgement concerning operation of the main switch 13a, the suspended time D is repeatedly compared with threshold suspended time Dr. The suspended time D becomes equal to or greater than the threshold suspended time Dr, the running-in operation of the shutter system is caused in spite of operation of the main switch 13a.

Returning to FIG. 2, as described above, performing the running-in operation of the shutter system in this way favorably maintains the given coefficient of friction between the shutter blades 23 and 24 and the given condition of lubrication, so that the shutter blades 23 and 24 cause return movement without a time delay and achieve stable movement with a fixed speed, which results in providing a precisely controlled exposure time interval TEV, and hence exposing a film unit 17 with an accurate exposure value EV.

Figure 6:
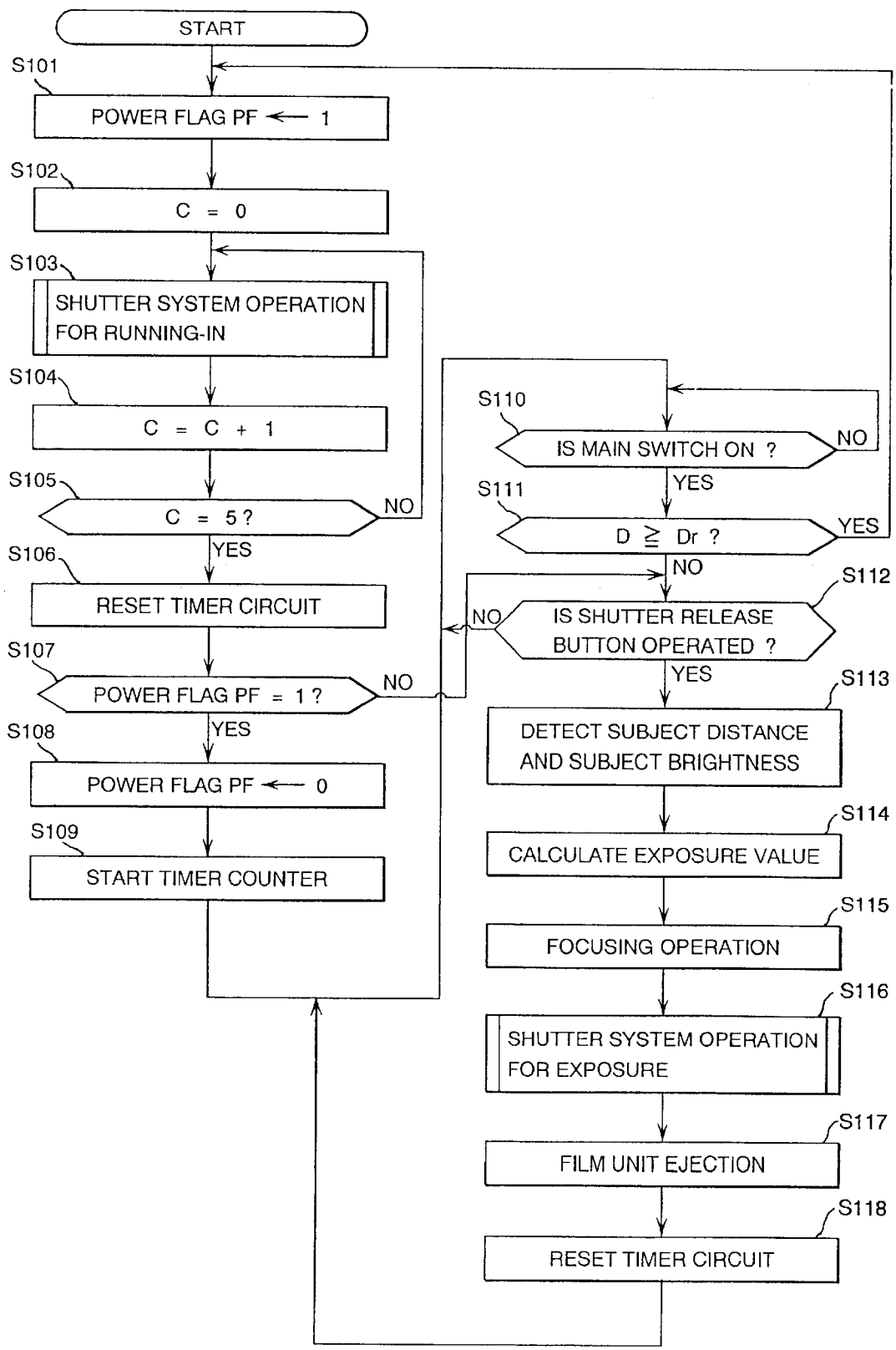

The auxiliary shutter drive system may be modified so as to perform the running-in operation of the shutter system only while the main switch 13a remains on. This modification can be accomplished by simply shifting the judgement concerning operation of the main switch 13a in the main sequential routine of camera operation control illustrated by the flow chart in FIG. 4 before the comparison of the suspended time D with the threshold suspended time Dr as illustrated by a flow chart in FIG. 6. In this variation, the system controller 20 causes the timer circuit 40 to count a suspended time since the latest open and close movement of the shutter blades 23 and 24 in spite of operation of the main switch 13a. The suspended time D is repeatedly compared with the threshold suspended time Dr only while the main switch 13a remains on. When the suspended time D becomes equal to or greater than the threshold suspended time Dr, the system controller 20 performs the running-in operation of the shutter system. Specifically, when the suspended time D is equal to or greater than the threshold suspended time Dr while the main switch 13a remains on, the system controller 20 starts the running-in operation of the shutter system at the moment that the suspended time D reaches the threshold suspended time Dr and repeats it five times. On the other hand, when the suspended time D is equal to or greater than the threshold suspended time Dr while the main switch 13a remains off, the system controller 20 starts the running-in operation of the shutter system at the moment that the main switch 13a is thereafter turned on and repeats it five times.

Figure 7:
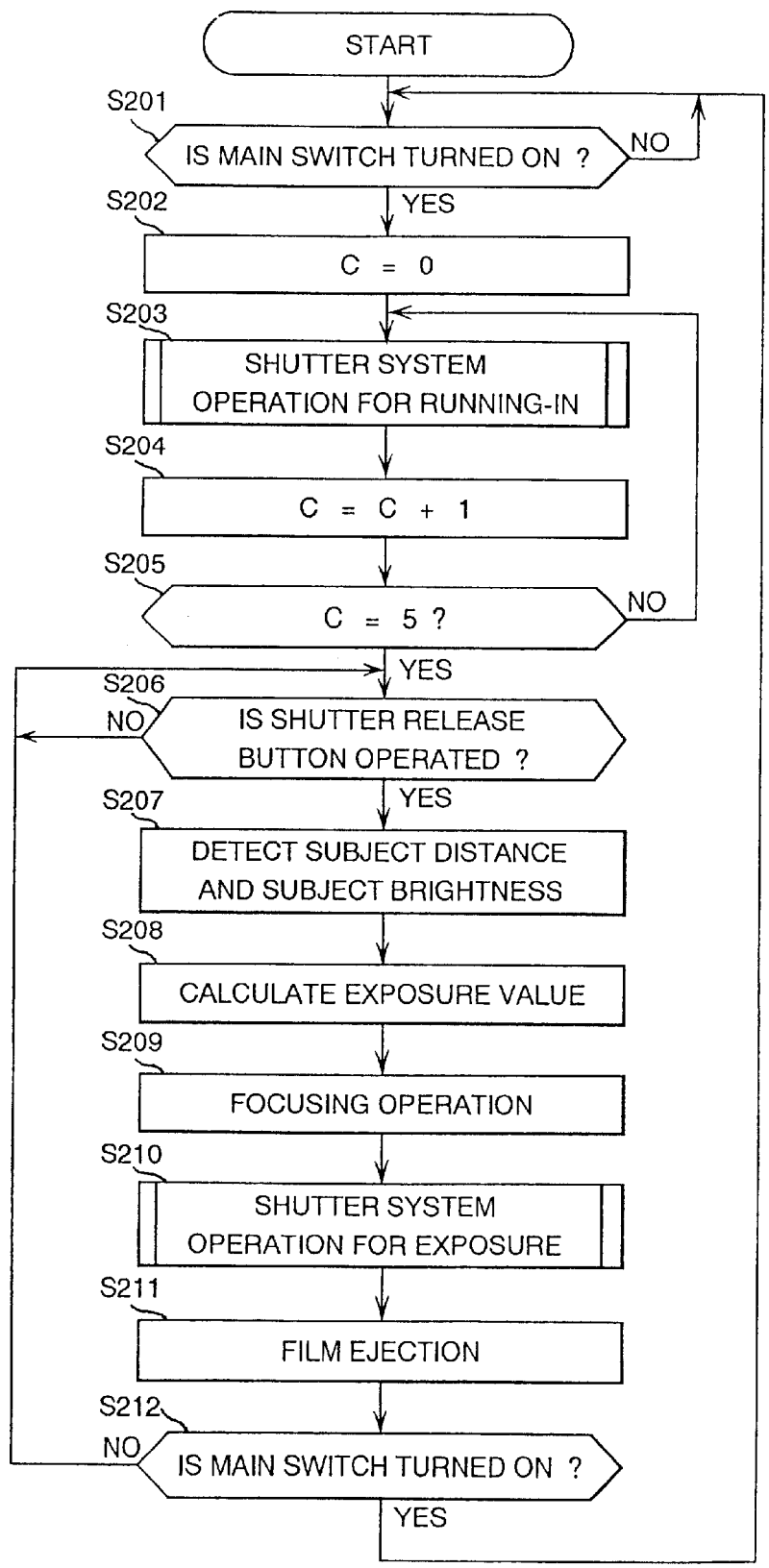

FIG. 7 is a flow chart illustrating a main sequential routine of camera operation control for an instant camera equipped with an auxiliary shutter drive system in accordance with another embodiment of the invention which is the same in structure as that shown in FIGS. 1 and 2 excepting that there is not provided the timer circuit 40. In this embodiment, the running-in operation of the shutter system is performed whenever the instant camera is powered on.

When the camera operation control main sequential routine commences and control proceeds directly to a block at step S201 a judgement is repeated as to whether the main switch 13a is operated to power the instant camera on. When the instant camera is powered on, after protruding the lens barrel 3 in position to put the taking lens 7 ready for focusing, the control system 20 resets the variable C indicative of the number of times of repetition of the running-in operation to zero (0) at step S202. Subsequently, the shutter drive sequential subroutine shown in FIG. 5 is called for to perform the running-in operation of the shutter system at step S203. At the end of the running-in operation of the shutter system, the final step orders return to the main routine after the step in the main routine calling for the shutter drive sequential subroutine. In the main routine, after changing the variable C by an increment of one every operation of the shutter system for running-in at step S204, a judgement is made at step S205 as to whether the running-in operation of the shutter system has been repeated five times, i.e. whether the variable C is "5." The process from step S203 to step S205 is repeated until the running-in operation of the shutter system is repeated five times. At the end of five times of the running-in operation of the shutter system, the instant camera is put ready for exposure.

Subsequently, a judgement is made at step S206 as to whether the shutter release button 10 is pushed. When the shutter release button 10 is pushed, a subject distance and a subject brightness are detected at step S207. The system controller 20 calculates an exposure value EV based on data of the subject brightness transferred thereto from the photosensor 16 through the A/D converter 16a at step S208. Specifically, the system controller 20 refers the data table in ROM 20a to transform the subject brightness data into an exposure time interval $T_{EV}$ which is greater than zero. At the same time, the lens barrel 3 is adjusted to focus the taking lens 7 on the intended subject according to the subject distance at step S209. Subsequently, at step S210, the shutter drive sequential subroutine shown in FIG. 5 is called for to perform operation of the shutter system for exposure.

When the shutter drive sequential subroutine is executed once to make exposure of the foremost film unit 17 in the instant camera and the pulse motor 25 stops, the final step orders return to the main routine after the step in the main routine calling for the shutter drive sequential subroutine. In the main routine, the exposed instant film unit 17 is ejected and processed at step S211. Finally, a judgement is made at step S212 as to whether the main switch 13a is turned off. While the main switch 13a remains on, the process from step S206 to step S212 is repeated for another exposure. On the other hand, when the main switch 13a is turned off, the instant camera is put suspended until the main switch 13a is turned on again.

Returning to FIG. 2, with the instant camera equipped with an auxiliary shutter drive system in accordance with this embodiment, the running-in operation of the shutter system is performed immediately after every powering-on the instant camera, so as to maintain the given coefficient of friction between the shutter blades 23 and 24 and the given condition of lubrication desirable for precise and stable movement of the shutter blades 23 and 24 without a time delay and achieve with the result of providing a precisely controlled exposure time interval TEV, and hence with exposing a film unit 17 with an accurate exposure value EV.

In the above embodiments, the timing at which the shutter blades 23 and 24 starts return movement in the opposite closing directions is controlled by the aid of slits 29a–29d formed in the shutter blade 23. In the event where the pulse motor is employed, the timing may be controlled by counting a specified number of drive pulses supplied to the pulse motor, or otherwise may be controlled by counting time from a point of time at which the shutter blades 23 and 24 start to move in the opposite opening directions.

Figure 8:
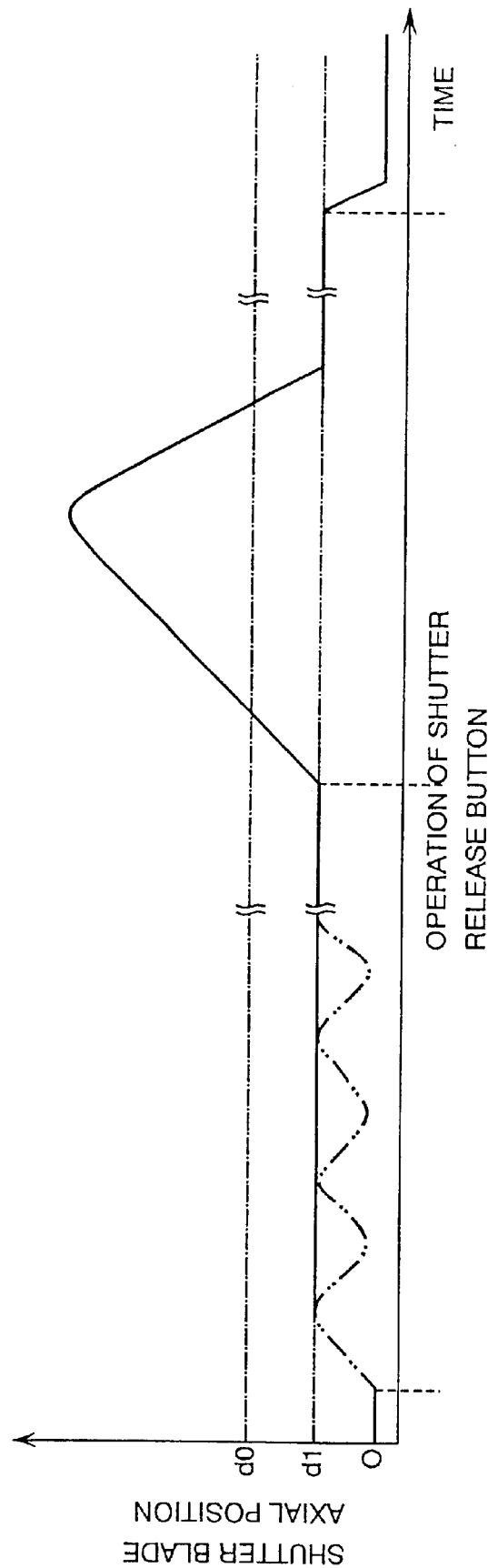
FIG. 8 is a time chart of running-in operation of the shutter blades between an initial position and a position before an opening position where the shutter blades are on point of starting to develop an aperture therebetween.

The running-in operation of the shutter system may be performed by causing the shutter blades 23 and 24 to move to a stand-by position in which the shutter blades 23 and 24 stand ready for exposure immediately after powering on the instant camera as shown in FIG. 8.

FIG. 8 shows a time chart in which the origin (O) is the rest position of the shutter blades 23 and 24, and a distance d0 from the rest position indicates the opening position where the shutter blades 23 and 24 are on point of starting to develop an aperture between their V-shaped cut-outs 23b and 24b. The stand-by position is at a distance d1 from the rest position (O) between the rest position (O) and the opening position. As shown by a solid line in FIG. 8, both shutter blades 23 and 24 are situated in the rest position (O) while the instant camera is powered off. In response to powering on the instant camera, the pulse motor 25 rotates to turn the rotary arm 27 in the clockwise direction, so as to slide the shutter blades 23 and 24 in the opposite opening directions, respectively, toward the opening position and stops when the shutter blades 23 and 24 reach the opening position. As the result of slide movement, the shutter blades 23 and 24 are run in to attain the given coefficient of friction therebetween and the given condition of lubrication. When the shutter release button 10 is subsequently pushed, the pulse motor 25 rotates in the forward direction to slide the shutter blades 23 and 24 in the opposite opening directions, respectively, and is reversed to slide the shutter blades 23 and 24 back in the opposite closing directions, respectively, to the opening position. During the back and forth slide movement of the shutter blades 23 and 24 exposure of the foremost film unit 17 is completed. In response to powering off the instant camera, the pulse motor 25 rotates to turn the rotary arm 27 in the counterclockwise direction, so as to further slide the shutter blades 23 and 24 back in the opposite closing directions, respectively, to the rest position and then stops. The shutter blades 23 and 24 can be run in with an enhanced effect by being repeatedly moved back and forth between the rest and stand-by positions as shown by a double-dotted line in FIG. 8.

Figure 9:
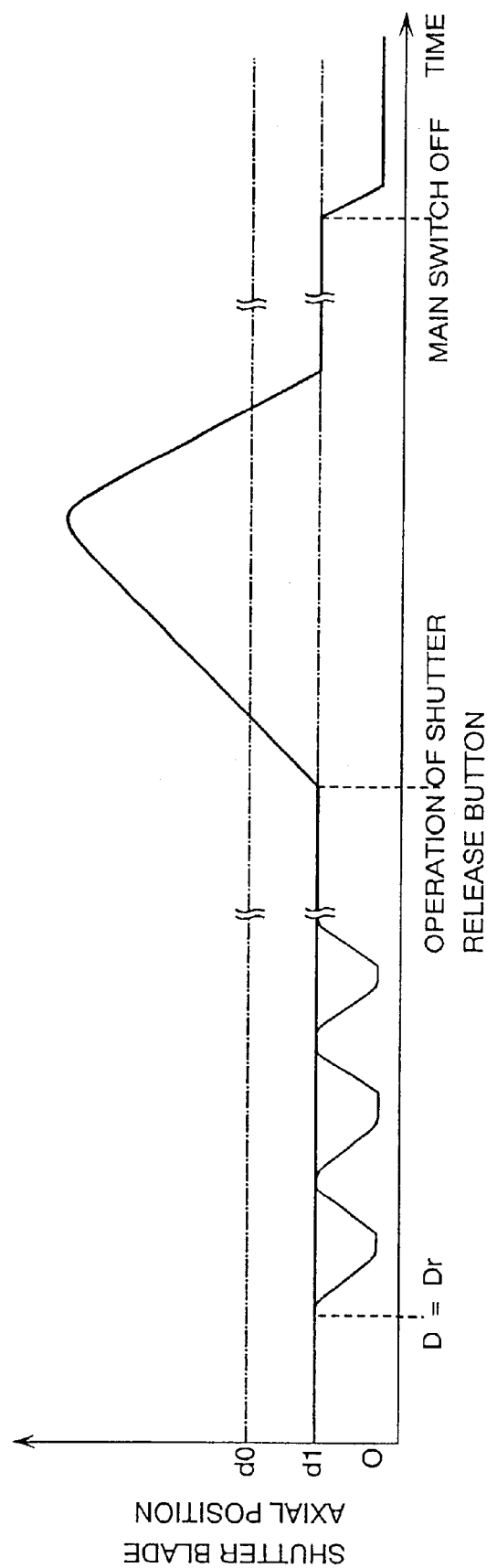

The shutter system may be run in while the instant camera remains powered on or powered off as well as immediately after it is powered on. In the case where the shutter system is run in after having powered on the instant camera, the shutter blades 23 and 24 staying in the stand-by postion (d1) are be slid back to the rest postion and returned to and situated in the stand-by postion after repeated slide movement between the rest and stand-by postions as shown in FIG. 9. In the case where the shutter system is run in while the instant camera remains powered off, the shutter blades 23 and 24 staying in the rest postion (0) are slid forth to the stand-by postion and returned to and situated in the rest postion after repeated slide movement between the rest and stand-by postions.

Returning to FIG. 2, in place of the pulse motor 25, various types of DC motors or solenoids, or various combinations of motor and spring or solenoid and spring can be employed as the actuator. Further, the shutter blades 23 and 24 may be driven with less energy for running-in operation than for exposure operation, as a result of which the shutter blades 23 and 24 are safely run in. For this end, the pulse motor 25 may be supplied with a lower current so as to provide less output torque for running-in operation than for exposure operation. The shutter system, which is of the programmed type in these embodiments, may be of a non-programmed type which controls only an exposure time. The shutter system may be run in only immediately after the instant camera is powered on.

FIGS. 10 through 14 show an instant camera equipped with a power zooming system and a power focusing system in accordance with another embodiment of the invention.

Figure 10:
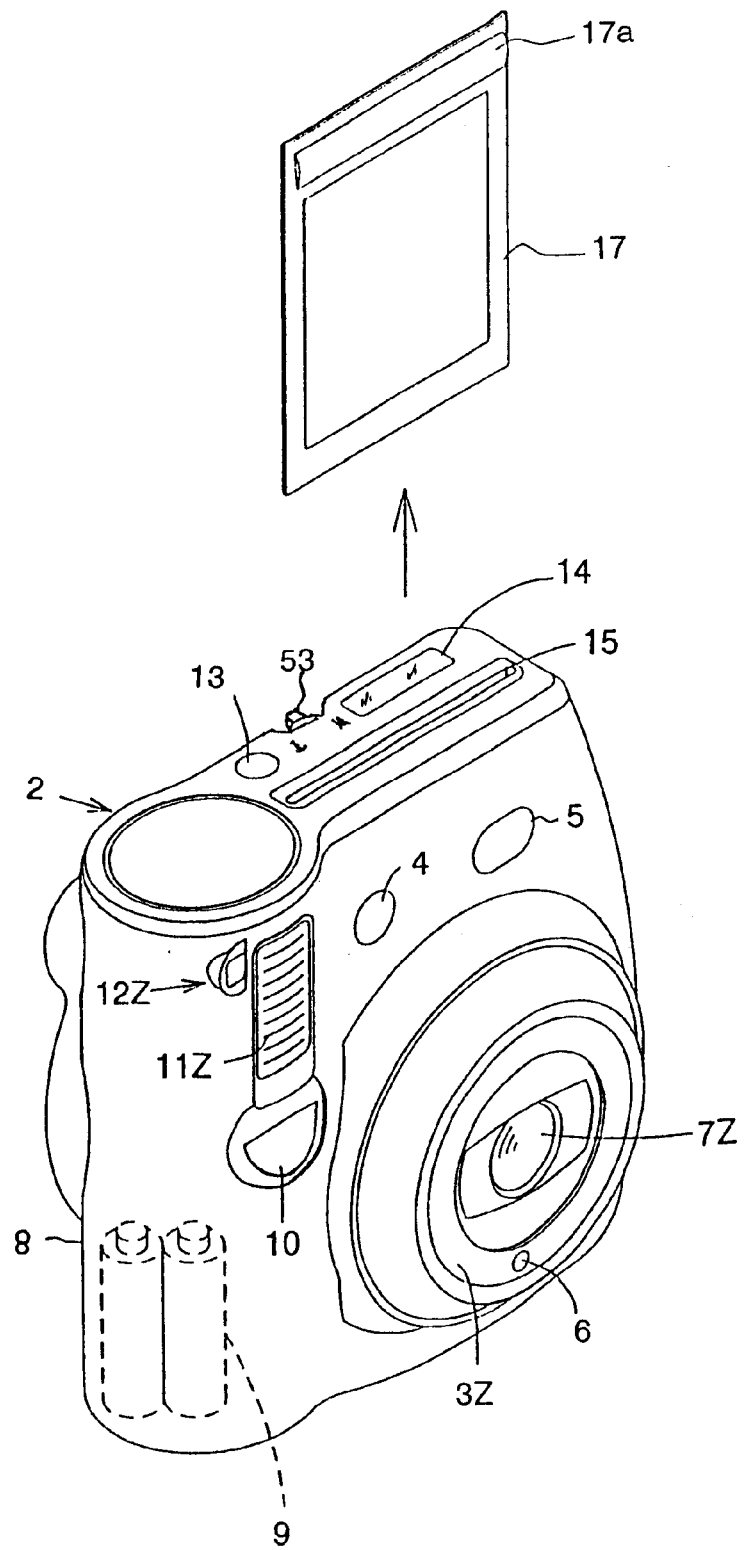
FIG. 10 is a perspective view of an instant camera equipped with an auxiliary drive system of the invention which performs running-in operation for a zooming system and a focusing system as well as a shutter system.

As shown in FIG. 10, a camera body 2 of the instant camera is formed with a grip 8 as integral part thereof. The instant camera is equipped with a motor drive type of zoom lens 7Z in a collapsible zoom lens barrel assembly 3Z, a range finding system including a light projection window 4 and a light reception window 5, a light metering system including a light metering window 6, which are installed to or formed in the front wall of the camera body 2, and a main switch button 13 and an liquid crystal display (LCD) 14, which are installed to the top wall of the camera body 2. The LCD 14 which is driven to display data necessary for exposure.

The camera body 2 has an ejection slot 15 formed in the top wall through which a developed instant film unit 17 is ejected out. The grip 8 is provided with a shutter release button 10, a built-in variable angle automatic flash system 11Z and a variable magnification finder system 12Z installed to the front section thereof and batteries 9 installed therein. All electric parts and mechanisms of the instant camera are powered with electric power from the batteries 9. A zooming knob 53, which is installed to a back wall of the camera body 2 and held in a neutral position, is operative to causes a power zoom mechanism including a zooming motor 65 such as a pulse motor (see FIG. 11) to shift the zoom lens 7Z toward a wide-angle end position (W) when it is forced to one direction W or toward a telephoto end position (T) when it is forced to another direction T. The automatic flash system 11Z varies an angle of illumination according to zooming. The variable magnification finder system 12Z varies an angle of view according to zooming. The main switch button 13 is operative to power on and off the instant camera. Whenever the main switch button 13 is pushed, a main switch 13a (see FIG. 2) is alternately turned on or off. The zoom lens barrel assembly 3Z is protruded and put ready for focusing following turning on the main switch 13a, and retracted into the camera body 2 following turning off the main switch 13a. While the main switch 13a remains turned off, even if the shutter release button 10 is pushed, no operation of the exposure mechanism including the shutter occurs. In the inside of the camera body 2 there are provided a photo-sensor 16 (see FIG. 2) disposed behind the light metering window 6 and a range finding system which includes an element disposed behind the for projecting an infrared beam toward a subject through the light projection window 4 and an infrared photo-sensor disposed behind the light reception window 5 for receiving an infrared beam reflected by the subject. These light metering system and range finding system are well known in various forms in the photographic art and may take any known forms. When pushing the shutter release button 10, exposure of an instant film unit 17 is made following achievement of adjusting the focus of the zoom lens 7Z on the subject by the range finding system and detection of the brightness of the subject by the light metering system. The exposure is performed by driving the shutter based on the brightness of the subject which is detected based on an output from the photo-sensor 16.

The camera body 2 at its back has a film pack receiving chamber (not shown) for receiving a film pack in which a stuck of mono-sheet type of instant film units 17 is loaded. Every time the shutter release button 10 is pushed, the foremost instant film unit 17 is exposed and automatically ejected through the ejection slot 15. Specifically, the exposed instant film unit 17 is forced to advance between a pair of processing rollers disposed immediately before the ejection slot 15. As the exposed instant film unit 17 is advanced, the processing roller pressure ruptures the pod of jelly like developer 17a at the top of the film unit 17 and spreads the developer in an even layer between the face-to-face sheets. The automatic self-processing is completed so that a finished print is available for viewing in seconds or minutes.

Figure 11:
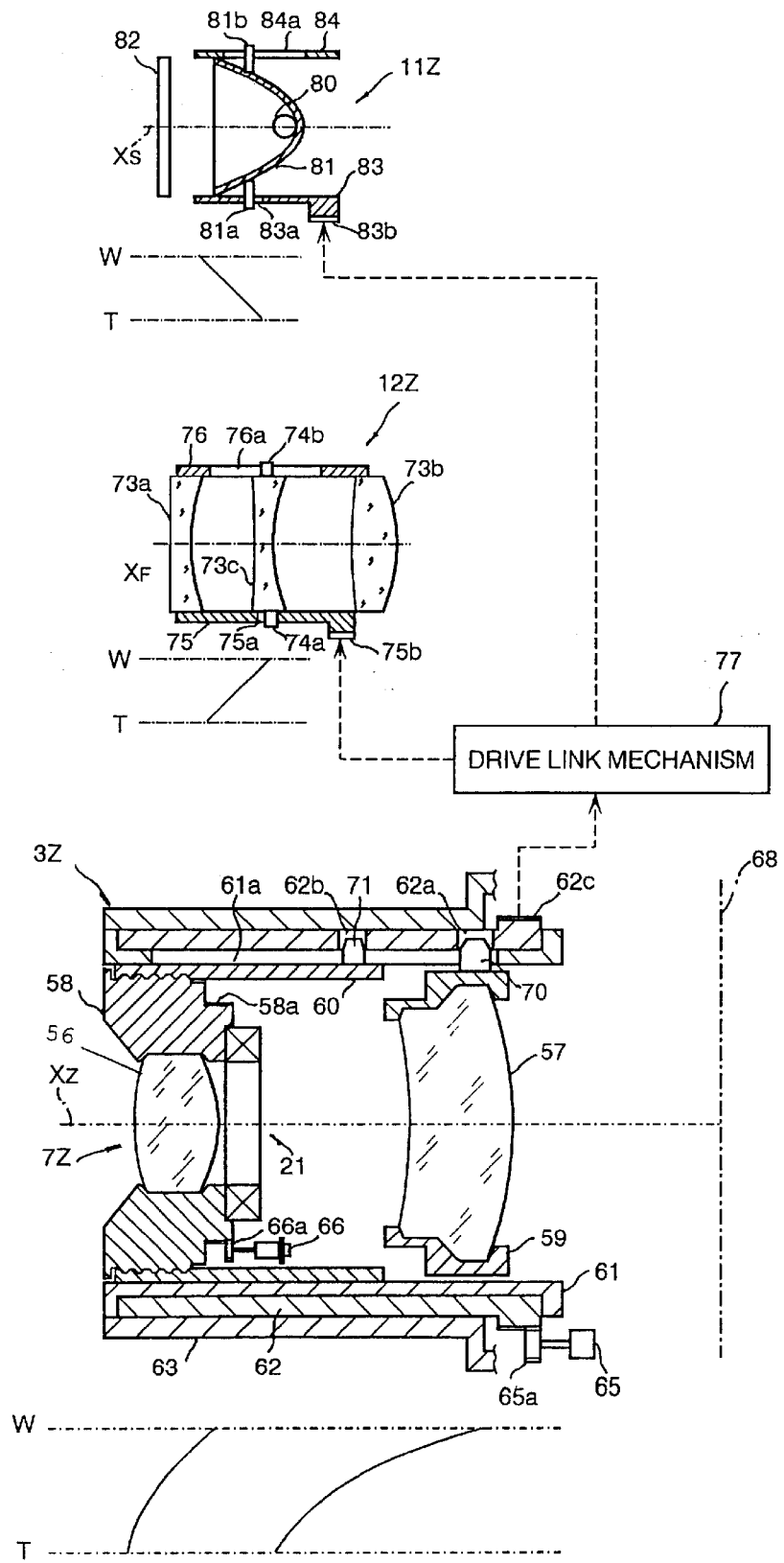
FIG. 11 is a block diagram showing an essential structure of the instant camera shown in FIG. 10 according to an preferred embodiment of the invention.

Referring to FIG. 11, the zoom lens 7Z comprises two lens groups, namely a front lens group 56 which is held by a front lens holder 58 and a rear lens group 57 which is held by a rear lens holder 59. The zoom lens barrel assembly 3Z comprises four cylindrical barrels, namely an inner movable barrel 60 in which the front lens holder 58, a stationary barrel 61, a rotary intermediate rotary barrel 62 and an outer rotary barrel 63. The stationary barrel 61 is secured to the camera body 2. The zoom lens 7Z is equipped with a zooming motor 65 which is actuated to achieve zooming by moving the front and rear lens groups 56 and 57 along the optical axis XZ relative to each other and relative to a stationary axial position such as an image plane 68 and a focusing motor 66 such as a pulse motor which is actuated to achieve focusing from infinity to moderately close distances by moving the front lens group 56 along the optical axis XZ. A shutter mechanism 21 is attached to the front lens holder 58 and located behind the front lens group 56. The inner movable barrel 60 is received in the stationary barrel 61 such that it is permitted to cause straight movement along the optical axis XZ and, however, prevented from rotation about the optical axis XZ. The front lens holder 58 is fitted in the inner movable barrel 60 by means of engagement between helicoidal threads and is linked to the focusing motor 66 by means of engagement between a peripheral gear 58a of the front lens holder 58 and an output gear 66a of the focusing motor 66. Rotation of the focusing motor 66 is transmitted to the front lens holder 58 through the engagement between the peripheral gear 58a and the output gear 66a with an effect of causing axial movement of the front lens holder 58, and hence the front lens group 56, relative to the inner movable barrel 60 through the engagement between helicoidal threads. The stationary barrel 61 is formed with a straight guide slot 61a in parallel to the optical axis XZ. The intermediate rotary barrel 62, which is mounted for rotation on the stationary barrel 61, is formed with peripheral cam grooves 62a and 62b in its inner wall and a peripheral gear 62c on its outer wall. The intermediate rotary barrel 62 is linked to the zooming motor 65 by means of engagement between the peripheral gear 62c and an output gear 65a of the zooming motor 65. Rotation of the zooming motor 65 is transmitted to the intermediate rotary barrel 62 through the engagement between the peripheral gear 62c and the output gear 65a with an effect of causing rotation of the intermediate rotary barrel 62 relative to the stationary barrel 61. The rear lens holder 59 and the inner movable barrel 60, which are independently fitted for axial movement into the stationary barrel 61, are provided with cam follower pins 70 and 71, respectively, which passes through the straight guide slot 61a of the stationary barrel 61 and are received in the peripheral cam grooves 62a and 62b of the intermediate rotary barrel 62, respectively. Rotation of the intermediate rotary barrel 62 is transmitted to the rear lens holder 59 and the inner movable barrel 60 through engagement between the peripheral cam grooves 62a and 62b and the cam follower pins 70 and 71, so that the rear lens holder 59 and the inner movable barrel 60, and hence the front lens holder 58, are forced by the cam grooves 62a and 62b to independently slide back and forth along the straight guide slot 61a with an effect of changing an axial distance between the front and rear lens holders 58 and 59, i.e. the front and rear lens groups 56 and 57.

The variable magnification finder system 12Z comprises an objective lens 73a, an eye piece lens 73b and a magnifying lens 73c which is movable between the objective lens 73a and the eye piece lens 73b. Although not shown in FIG. 11, the finder system 12Z is provided with a fixed size of frame for defining a visual field and a drive mechanism for moving the magnifying lens 73c along an axis XF of the finder system 12Z to change the magnification according to zooming ratios of the zoom lens 7Z so as to make both fields agree with each other. The finder system 12Z includes a semi-circular stationary lens holder 76 formed with a straight guide slot 76a and a circular-arcuate movable cam member 76 formed with a cam slot 75a and a peripheral sector gear 75b which is disposed in a diametrically opposite position and able to turn about the axis XF with respective to the stationary lens holder 76. The stationary lens holder 76 fixedly holds the objective lens 73a and the eye piece lens 73b at its opposite ends and support and the magnifying lens 73c for slide movement along the axis XF. The circular-arcuate cam member 76 is formed with a peripheral gear or a rack 75b which is linked to the peripheral gear 62c of the intermediate rotary barrel 62 through a drive link mechanism 77 schematically shown in FIG. 11. The magnifying lens 73c is provided with a cam follower pin 74a and a guide pin 74b arranged in diametrically opposite positions which are received in the cam slot 75a of the movable cam member 75 and the straight guide slot 76a of the stationary lens holder 76. Rotation of the zooming motor 65, and hence the intermediate rotary barrel 62, is reduced by and transmitted to the cam member 75 through the drive link mechanism 77 so as to cause the cam member 75 to turn about the axis XF in opposite directions or to slide in a direction spatially perpendicular to the axis XF in opposite directions. As a result, the magnifying lens 73c is forced by the cam slot 75a to slid back and forth along the straight guide slot 76a between a wide-angle end position (W) in which the finder system 12Z has a given minimum finder magnification and a telephoto end position (T) in which the finder system 12Z has a given maximum finder magnification, so as thereby to change the finder magnification according to zoom ratios.

The automatic flash system 11Z comprises a discharge tube 80 and a reflector 81, which are coupled together, and a stationary Fresnel lens 82. The automatic flash system 11Z includes a stationary reflector holder 84 formed with a straight guide slot 84a and a movable cam member 83 formed with a cam slot 83a and a peripheral sector gear 83b which is disposed in a diametrically opposite position and able to turn about the an axis Xs of the automatic flash system 11Z with respective to the stationary lens holder 84. The stationary reflector holder 84 fixedly holds the reflector 81. The cam member 83 is formed with a peripheral gear or a rack 83b which is linked to the peripheral gear 62c of the intermediate rotary barrel 62 through the drive link mechanism 77. The reflector 81 is provided with a cam follower pin 81a and a guide pin 81b arranged in diametrically opposite positions which are received in the cam slot 83a of the movable cam member 83 and the straight guide slot 84a of the stationary reflector holder 84. Rotation of the zooming motor 65, and hence the intermediate rotary barrel 62, is reduced by and transmitted to the cam member 83 through the drive link mechanism 77 so as to cause the cam member 75 to turn about the axis Xs in opposite directions or to slide in a direction spatially perpendicular to the axis Xs in opposite directions. As a result, the reflector 81 to which the discharge tube 80 is coupled together is forced by the cam slot 83a to slid back and forth along the straight guide slot 84a with an effect of changing an axial distance to the Fresnel lens 82 between a wide-angle end position (W) in which the automatic flash system 11Z has a given maximum angle of illumination and a telephoto end position (T) in which the automatic flash system 11Z has a given minimum angle of illumination, so as thereby to change the angle of illumination according to zoom ratios.

The zoom lens barrel assembly 3Z, the variable angle automatic flash system 11Z and the variable magnification finder system 12Z are run in together with the shutter system. That is, the zoom lens barrel assembly 3Z including movable members such as the rear lens holder 59, the inner movable barrel 60 and the intermediate rotary barrel 62, the variable angle automatic flash system 11Z including a movable member such as the magnifying lens 73c and the variable magnification finder system 12Z including a movable member such as reflector 81 are run in to maintain the given coefficient of friction and the given condition of lubrication for these movable members and their associated parts.

Figure 12:
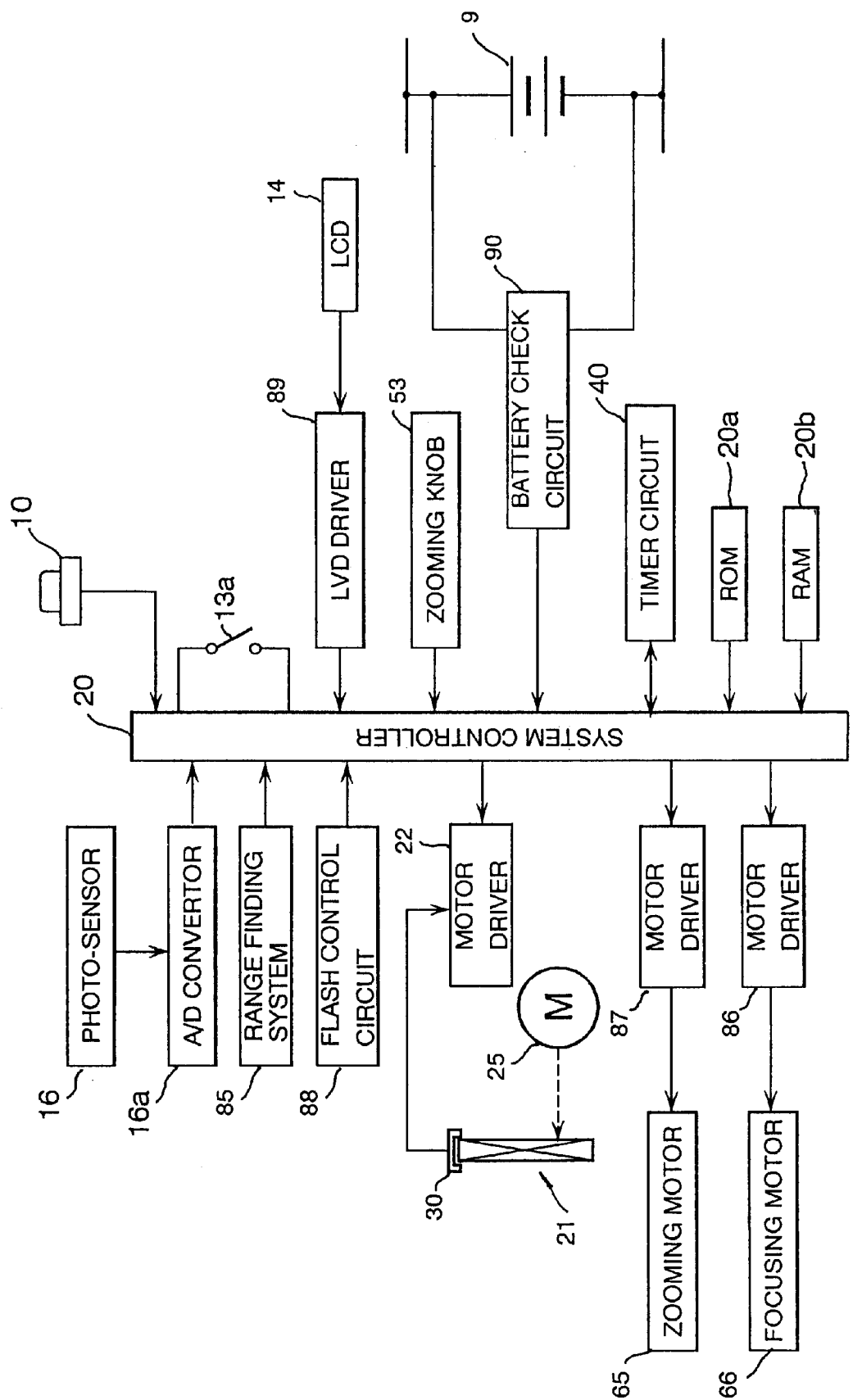
FIG. 12 is a cross-sectional view of an essential mechanisms of the instant camera shown in FIG. 10.

FIG. 12 schematically shows control system of the instant camera equipped with the programmed shutter system, the zoom lens 7Z, the variable angle automatic flash system 11Z and the variable magnification finder system 12Z shown in FIGS. 10 and 11. A range finding system 85, which includes an element disposed behind the light projection window 4 for projecting an infrared beam toward a subject through the light projection window 4 and an infrared photo-sensor disposed behind the light reception window 5 for receiving an infrared beam reflected by the subject, detects a distance to a subject from the camera body 2 and sends a subject distance signal to a system controller 20. When the zooming knob 53 is operated in either direction, the system controller 20 provides a directional signal corresponding to the direction of operation of the zooming knob 53 and a zooming control pulse which are both sent to a zooming motor drives circuit 86 to control rotation of the zooming motor 65. The zooming motor driver circuit 86 provides a specified number of drive pulses to cause the zooming motor 65 to rotate through a fixed angular every time it receives one zooming control pulse. The drive pulse is changed between normal and reversed phases according to directions of rotation. Rotation of the zooming motor 65 causes the zoom lens 7Z between the wide-angle end position (W) and the telephoto end position (T) to change the zoom ratio. The rotation of the zooming motor 65 is transmitted to both variable angle automatic flash system 11Z and variable magnification finder system 12Z through the drive link mechanism 77 to shift the magnifying lens 73b and the reflector 81 between their wide-angle end positions (W) and telephoto end positions (T). When the shutter release button 10 is pushed, the system controller 20 determines a focusing distance by which the front lens group 56 is axially forced forward to focus the zoom lens 7Z on the subject based on the subject distance and the focal length of the zoom lens 7Z and provides the focusing motor driver circuit 87 with focusing control pulses the number of which depends upon the focusing distance. The focusing distance is defined an axial distance from a fixed initial or rest position with respect to the inner movable barrel 60. The focusing motor driver circuit 87 provides a drive pulse and causes the focusing motor 66 to rotate through a fixed angular every time it receives one focusing control pulse. Rotation of the focusing motor 66 causes the front lens group 56 to move axially forward by the focusing distance from the fixed reference position. In response to completion of exposure, the focusing motor driver circuit 87 reverses the focusing motor 66 to rotate in the reverse direction, forcing the front lens group 56 to the fixed reference position. A flash circuit 88 is operative to cause the discharge tube 80 to make a flash in synchronism with operation of the shutter blades 23 and 24 in the manner well known in the art. An indication that the shutter system, the power zooming system and the power focusing system are under running-in operation is shown on an LCD 14 which is driven by an LCD driver 89 to display data necessary for exposure. This indication makes the photographer become aware that the shutter system, the power zooming system and the power focusing system are now being driven not from a fault but for running-in operation. A battery check circuit 90 checks the voltage of the batteries 9 under a specified load. The measured voltage is used to make a judgement as to power of the batteries 9 by the system controller 20. The system controller 20 actuates the shutter system, the power zooming system and the power focusing system for running-in operation whenever the main switch 13a is turned on or when a suspended time D counted by a timer circuit 40 reaches the threshold suspended time Dr while it remains powered on. The timer circuit 40 is reset after every exposure. Prior to the running-in operation, the system controller 20 actuates the battery check circuit 90 to make a check on battery power. If the battery power is in short supply, the system controller 20 evades actuation of the shutter system, the power zooming system and the power focusing system for running-in operation so as to evade operational troubles for lack of battery power or to save the battery power for making reliable exposure.

During the running-in operation, the zooming system is operated to repeat axial movement of the zoom lens 7Z between the wide-angle end position (W) and the telephoto end position (T), or otherwise between predetermined axial positions, several times, and the focusing system is operated to repeat axial movement of the front lens group 56 between the extreme front position and the rest position, or otherwise between predetermined axial positions, several times. The running-in operation of the shutter system is performed in the same manner as described above.

Figure 13:
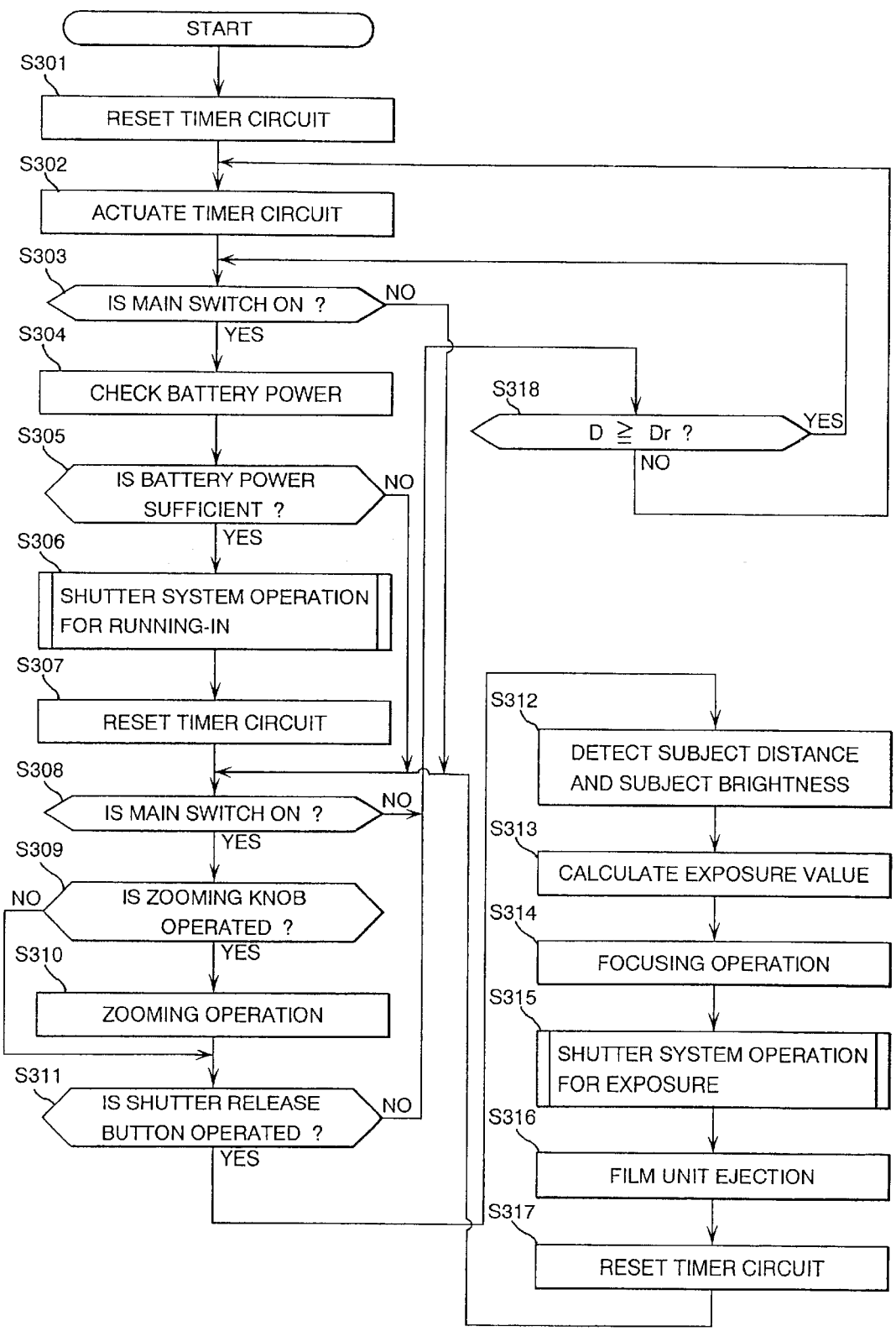
FIG. 13 is a flow chart illustrating a main sequential routine of camera operation control from loading batteries to making exposure.
Figure 14:
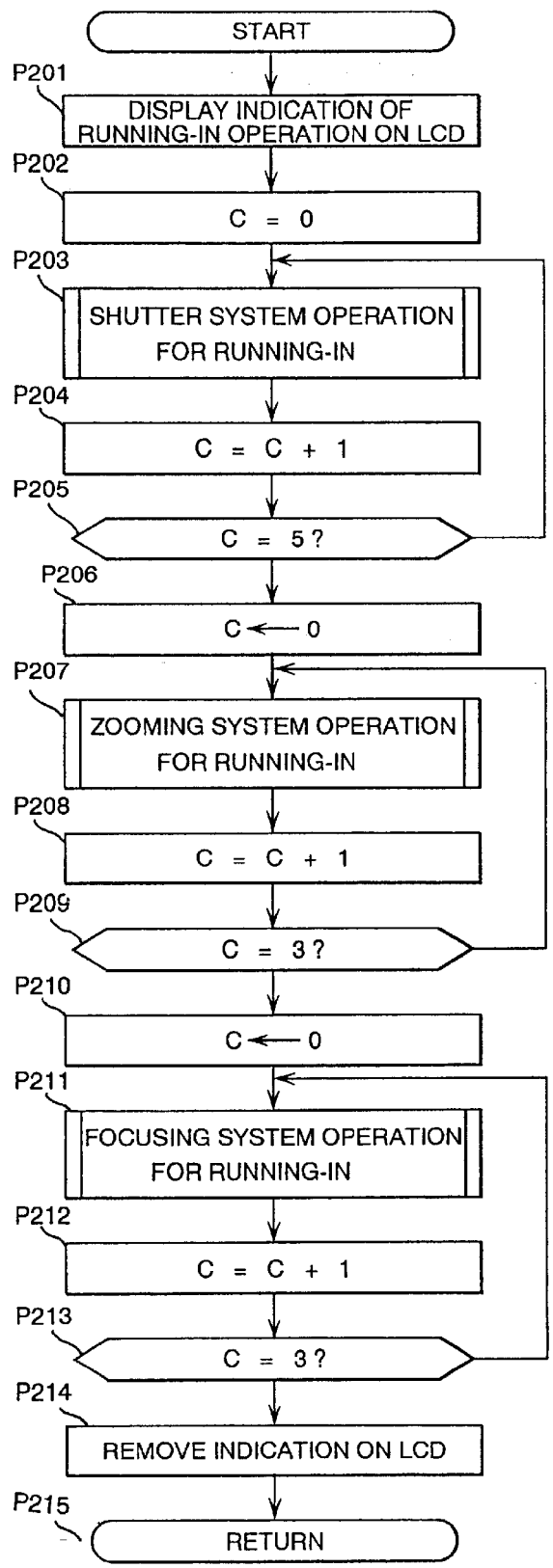
FIG. 14 is a flow chart illustrating a sequential subroutine of running-in operation control.

FIG. 13 is a flow chart illustrating a sequential main routine of camera operation control. When the instant camera is loaded with batteries 9 and is powered on, the system controller 20 performs the camera operation control main routine of FIG. 13. When the camera operation control main routine commences, and control proceeds to a block at step S301 where the timer circuit 40 is reset and then to a block at step S302 where the timer circuit 40 is actuated to count time D. Subsequently, a judgement is made at step S303 as to whether the main switch 13a is turned on. The battery check circuit 90 is actuated in response to turn-on of the main switch 13a to check the power of batteries 9 under the predetermined load at step S304. Subsequently, a judgement is made at step S305 as to whether the batteries 9 still have sufficient power for the running-in operation. When it is determined that the batteries 9 still have sufficient power for the running-in operation, a sequential subroutine of running-in operation control shown in FIG. 14 is called for and the running-in operation control is performed at step S306. In the event where it is determined at step S303 that the main switch 13a remains off or at step S305 that the battery power is in short supply for the running-in operation, the system controller 20 puts the instant camera ready for exposure.

Referring to FIG. 14 which is a flow chart of the running-in operation control subroutine, when the running-in operation control subroutine commences, after driving the LCD driver 89 to display an indication that the instant camera is now under running-in operation on the LCD 14 at step P201 and resetting the variable C indicative of the number of times of repetition of the ruing-in operation to zero (0) at step P202, a shutter drive sequential subroutine shown in FIG. 5 is called for and actuates the shutter system for the running-in operation at step P203. The final step in the shutter drive sequential subroutine orders return to the running-in operation control subroutine, after the step in the running-in operation control subroutine calling for the shutter drive sequential subroutine for running-in operation of the shutter system.

In the running-in operation control subroutine, after changing the variable C by an increment of one at step P204, a judgement is made at step P205 as to whether the running-in operation of the shutter system has been repeated five times, i.e. whether the variable C is "5" which is the maximum number of times of repetition of the running-in operation of the shutter system in the system controller 20. The process from step P203 to step P205 is repeated until the running-in operation of the shutter system is repeated five times. Subsequently, after resetting the variable C indicative of the number of times of repetition of the running-in operation to zero (0) at step P206, a zooming system drive sequential subroutine (not shown) is called for and actuates the zooming system for the running-in operation at step P207.

In the zooming system drive sequential subroutine, the system controller 20 provides a directional signal and a specified number of zooming control pulses for forward rotation of the zooming motor 65 and sends them to the zooming motor driver circuit 86. The zooming motor driver circuit 86 actuate the zooming motor 65 to cause forward rotation of the intermediate rotary barrel 62 which is accompanied by forward movement of the rear lens holder 59 and the inner movable barrel 60 from the wide-angle end position (W) to the telephoto end position (T) along the optical axis Xz. Rotation of the intermediate rotary barrel 62 is also transmitted to the variable magnification finder system 12Z and the variable angle automatic flash system 11Z through the drive link mechanism 77, so as to cause forward movement of the magnifying lens 73c of the variable magnification finder system 12Z from the wide-angle end position (W) to the telephoto end position (T) along the optical axis XF and forward movement of the reflector 81 of the variable angle automatic flash system 11Z from the wide-angle end position (W) to the telephoto end position (T) along the optical axis Xs. Then, the system controller 20 provides a directional signal and a specified number of zooming control pulses for reversed rotation of the zooming motor 65 and sends them to the zooming motor driver circuit 86. The zooming motor driver circuit 86 actuate the zooming motor 65 to cause reversed rotation of the intermediate rotary barrel 62, so that the rear lens holder 59 and the inner movable barrel 60 return to their the wide-angle end positions (W) from the telephoto end positions (T) along the optical axes XF and Xs, respectively. Simultaneously, the magnifying lens 73c of the variable magnification finder system 12Z and the reflector 81 of the variable angle automatic flash system 11Z return to their wide-angle end positions (W) to the telephoto end positions (T) along the optical axes XF and Xs, respectively. Upon completion of this running-in operation of the zooming system, the final step in the zooming system drive sequential subroutine orders return to the running-in operation control subroutine, after the step in the running-in operation control subroutine calling for the zooming system drive sequential subroutine for running-in operation of the zooming system.

In the running-in operation control subroutine, after changing the variable C by an increment of one at step P208, a judgement is made at step P209 as to whether the running-in operation of the zooming system has been repeated a predetermined number of times, for example three times in this embodiment, i.e. whether the variable C is "3," in the system controller 20. The process from step P207 to step P209 is repeated until the running-in operation of the zooming system is repeated three times. Subsequently, after resetting the variable C indicative of the number of times of repetition of the running-in operation to zero (0) at step P210, a focusing system drive sequential subroutine (not shown) is called for and actuates the focusing system for the running-in operation at step P211.

In the focusing system drive sequential subroutine, the system controller 20 provides a predetermined number of focusing control pulses for forward rotation of the focusing motor 66 and sends them to the focusing motor driver circuit 87. The focusing motor driver circuit 87 actuate the focusing motor 66 to cause forward rotation of the front lens holder 58 with an effect of forward movement from the closest distance position to the infinity position. Subsequently, the system controller 20 provides a return signal and sends it to the focusing motor driver circuit 87. The focusing motor driver circuit 86 actuate the focusing motor 66 to cause reversed rotation of the front lens holder 58, so as thereby to move it back to the closest distance position. Upon completion of this running-in operation of the focusing system, the final step in the focusing system drive sequential subroutine orders return to the running-in operation control subroutines after the step in the running-in operation control subroutine calling for the focusing system drive sequential subroutine for running-in operation of the focusing system.

In the running-in operation control subroutine, after changing the variable C by an increment of one at step P212, a judgement is made at step P213 as to whether the running-in operation of the focusing system has been repeated a predetermined number of times, for example three times in this embodiment, i.e. whether the variable C is "3," in the system controller 20. The process from step P112 to step P213 is repeated until the running-in operation of the focus system is repeated three times. Subsequently, the LCD 14 is deenergized to remove the indication of under running-in operation at step P214. Then, the final step in the running-in operation control subroutine P215 orders return to the camera operation control main routine, after the step in the camera operation control main routine calling for the running-in operation control subroutine for continuous camera operation control.

In the camera operation control main routine, after completion of the running-in operation, while the main switch 13a remains off, or when the battery power is in short supply for the running-in operation, the timer circuit 40 is reset to zero (0) and restarts counting time at step S307. When the main switch 13a is turned on at step S308, the instant camera is put ready for exposure. Subsequently, a judgement is made at step S309 as to whether the zooming knob 53 is operated in either direction, namely toward the wide-angle end (W) or the telephoto end (T). When the zooming knob 53 is operated at step S309, the zooming motor 65 is actuated to rotate in the forward or the reversed direction to cause zooming operation of the zooming system including the zoom lens 7Z, the variable magnification finder system 12Z and the variable angle automatic flash system 11Z at step S310. During the zooming operation the system controller 20 additively or subtractively count the focusing control pulses provided thereby one after another to detect the zoom ratio of the zoom lens 7Z. After completion of the zooming operation at step S310 or when the zooming knob 53 remains neutral, a judgement is made at step S311 as to whether the shutter release button 10 is operated. When the shutter release button 10 is not operated while the main switch 13a remains on, the control jumps to a block at step S318 where a judgement is made as to whether a suspended time D counted by the timer circuit 40 has reached the threshold suspended time Dr. The control returns to step before the judgement as to operation of the main switch 13a at step S303 if the suspended time D counted by the timer circuit 40 is less than the threshold suspended time Dr or to step after the judgement as to operation of the main switch 13a at step S303 if the suspended time D counted by the timer circuit 40 has exceeded the threshold suspended time Dr. On the other hand, when the shutter release button 10 is pushed down, measurements are made to find a distance to an intended subject by the range finding system 85 and the brightness of the subject by the photo-sensor 16 at step S312. The system controller 20 calculates an exposure value EV according to data of the subject brightness sent through the A/D converter 16a and transforms the exposure value EV into an exposure time interval $T_{EV}$ at step S313. Further, the system controller 20 calculates a moving distance by which the front lens group 56 is moved forward to focus the zoom lens on the subject based on data on the subject distance and the zoom ratio. Then, the system controller 20 provides focusing control pulses of a number depending on the moving distance and sends them to the focusing motor driver circuit 87, so as thereby to cause rotation of the focusing motor 66 until the front lens group 56 is forced forward by the moving distance, so as thereby to focus the zoom lens 7Z on the subject at step S314.

Subsequently, at step S315, the shutter drive sequential subroutine shown in FIG. 5 is called for to perform exposure operation of the shutter system. When the shutter drive sequential subroutine has been completed to finish exposure, then, the final step in the shutter drive subroutine orders return to the camera operation control main routine, after the step in the camera operation control main routine calling for the shutter drive subroutine for continuous camera operation control. In the camera operation control main routine, the exposed instant film unit 17 is automatically advanced between the processing rollers and ejected out of the instant camera at step S316. The processing roller pressure ruptures the pod of developer 17a of the film unit 17 and spreads the developer in an even layer between the face-to-face sheets. Finally, after ejecting the exposed film unit 17 out of the instant camera, the system controller 20 resets the timer circuit 40 to zero (0), and then to restart counting time D at step S317. The system controller 20 repeats steps S308 through S317.

In the camera operation control main routine, as described above, while the main switch 13a remains off or when the shutter release button 10 is not operated even while the instant camera is put ready for exposure, the time D is repeatedly compared with the threshold suspended time Dr. When the time D has reached the threshold suspended time Dr once, the shutter system, the power zooming system and the power focusing system are actuated several times for the running-in operation after checking the battery power, and the timer circuit 40 is reset and restarts counting the time D upon completion of the running-in operation. In the event where the battery power is in short supply, the shutter system, the power zooming system and the power focusing system are not run in. When the running-in operation is performed while the instant camera remains ready for exposure, the zooming motor 65 is controlled so that the zoom lens 7Z returns to a position in which it was situated before the running-in operation.

In the case where focusing the zoom lens 7Z is achieved by thrusting forward the front lens group 56 by a moving distance by open-loop control, there possibly occurs an error in controlling movement of the front lens group 56 correspondingly to the number of focusing control pulses due to deterioration of frictional condition and lubricating condition between the front lens group 56 and the inner movable barrel 60. However, in the above embodiment, the focusing system always operates in an intended good condition by running in the focusing mechanism and its associated parts before making exposure. Similarly, in the case where zooming the zoom lens 7Z is performed by open-loop control, there possibly occurs an error in controlling the zoom ratio of the zoom lens 7Z correspondingly to the number of zooming control pulses due to deterioration of frictional condition and lubricating condition between the movable mechanism and its associated parts of the zooming system. However, in the above embodiment, the zooming system always operates in an intended good condition by running in the zooming mechanism and its associated parts before exposure. Accordingly, even in the case where the instant camera has been left suspended for a long period of time, it is put ready for exposure in good operating condition and is prevented from causing an error in exposure operation. It is preferred to run in both zooming system and focusing system even employing closed-loop control of zooming and focusing.

Figure 15:
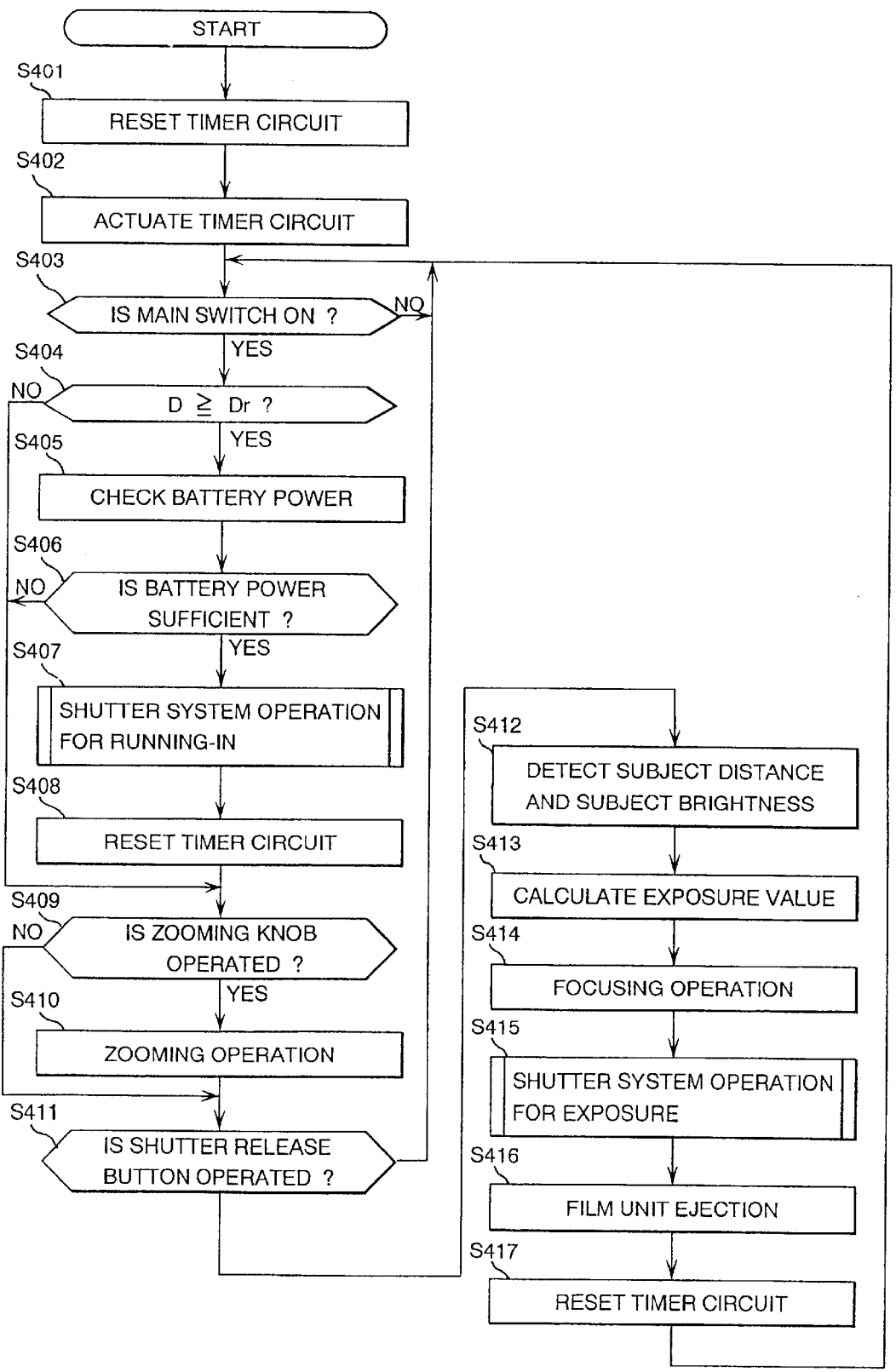

Referring to FIG. 15 which shows a flow chart of a camera operation control main routine for performing the running-in operation only when the time D has reached the threshold time Dr while the main switch 13a remains on. When the instant camera is powered on, the system controller 20 performs the camera operation control main routine of FIG. 15, and control proceeds to a block at step S401 where the timer circuit 40 is reset, and the starts counting time D at step S402. Subsequently, a judgement is made at step S403 as to whether the main switch 13a is turned on. When the main switch 13a is turned on, the time D counted by the timer circuit 40 is compared with a threshold suspended time Dr at step S404. Whenever the time D is less than the threshold suspended time Dr, the battery check circuit 90 is actuated in response to turn-on of the main switch 13a to check the power of batteries 9 under the predetermined load at step S405. Subsequently, a judgement is made at step S406 as to whether the batteries 9 still have sufficient power for the running-in operation. When it is determined that the batteries 9 have sufficient power for the running-in operation of the shutter system, the zooming system and the focusing system, the running-in operation control subroutine shown in FIG. 14 is called for and the running-in operation is performed at step S407. Subsequently, the timer circuit 40 is reset and restarts counting a suspended time D at step S408, then, the instant camera is put ready for exposure. In the event where it is determined that the suspended time D has reached the threshold suspended time Dr at step S404 or when the battery power is in short supply for the running-in operation, the system controller 20 puts the instant camera ready for exposure without performing the running-in operation.

Subsequently, a judgement is made at step S409 as to whether the zooming knob 53 is operated in either direction, namely toward the wide-angle end (W) or the telephoto end (T). When the zooming knob 53 is operated in either direction at step S409, the zooming operation is performed at step S410. After completion of the zooming operation or when the zooming knob 53 remains neutral, a judgement is made at step S411 as to whether the shutter release button 10 is operated. When the shutter release button 10 is not operated while the main switch 13a remains on, the control returns to step before the judgement as to operation of the main switch 13a at step S403. On the other hand, when the shutter release button 10 is pushed down, measurements are made to find a distance to an intended subject by the range finding system 85 and the brightness of the subject by the photo-sensor 16 at step S412. The system controller 20 calculates an exposure value EV according to data of the subject brightness sent through the A/D converter 16a and transforms the exposure value EV into an exposure time interval TEV at step S413. Further, the system controller 20 calculates a moving distance by which the front lens group 56 is moved forward to focus the zoom lens on the subject based on data on the subject distance and the zoom ratio. Then, the system controller 20 provides focusing control pulses of a number depending on the moving distance and sends them to the focusing motor driver circuit 87, so as thereby to cause rotation of the focusing motor 66 until the front lens group 56 is forced forward by the moving distance, so as thereby to focus the zoom lens 7Z on the subject at step S414.

Thereafter, at step S415, the shutter drive sequential subroutine shown in FIG. 5 is called for to perform exposure operation of the shutter system. When the shutter drive sequential subroutine has been completed to finish exposure, then, the final step in the shutter drive subroutine orders return to the camera operation control main routine, after the step in the camera operation control main routine calling for the shutter drive subroutine for continuous camera operation control. In the camera operation control main routine, the exposed instant film unit 17 is automatically advanced between the processing rollers and ejected out of the instant camera at step S416. The processing roller pressure ruptures the pod of developer 17a of the film unit 17 and spreads the developer in an even layer between the face-to-face sheets. Finally, after ejecting the exposed film unit 17 out of the instant camera, the system controller 20 resets the timer circuit 40 to zero (0), and then to restart counting time D at step S417. The system controller 20 repeats steps S403 through S417.

In both embodiments set forth above, on the assumption that both zooming system and focusing system are actuated whenever exposure is made, the timer circuit 40 is reset after every exposure. Although the shutter system is always actuated, there is, however, a possible chance for the zooming system and the focusing system to be not driven or make only insufficient operation during exposure. For this reason, the zooming system and the focusing system may be run in whenever they are left suspended for a predetermined threshold suspended time. This can be accomplished by installing another timer circuit operative to count a suspended time since the last operation of the zooming system and the focusing system to the instant camera, separately from the timer circuit 40 which is specialized to count a suspended time since the last operation of the shutter system. The other timer circuit is preferred to be reset when the zooming system and the focusing system have make sufficient operation during exposure as well as when the running-in operation has performed.

It is to be understood that the present invention may be embodied with various changes, modifications and improvements, which may occur to those skilled in the art, without departing from the spirit and scope of the invention defined in the following claims.

What is claimed is:

1. An auxiliary drive system for a power-driven apparatus which has an actuator and movable members driven by the actuator, said auxiliary drive system comprising:

control means for controlling said actuator to force said movable members to cause predetermined movement so as thereby to run in said movable members in response to one of loading the power-driven apparatus with a battery as a power source and powering on the power-driven apparatus.

2. The auxiliary drive system as defined in claim 1, wherein said control means permits said actuator to force said movable members to cause said predetermined movement so as thereby to run in said movable members only while said power-driven apparatus is powered with battery power higher than a predetermined level.

3. The auxiliary drive system as defined in claim 1, wherein said power-driven apparatus comprises a shutter system having a shutter blade as said movable member which is driven by said actuator in response to shutter release to make exposure on a photographic film through movement from an initial position to a position beyond an opening position in which said shutter blade is on point of starting said exposure and return movement to said initial position, and said control means controls said actuator to force said shutter blade to cause predetermined back and forth movement between said initial position and a position before said opening position so as thereby to run in said shutter blade.

4. The auxiliary drive system as defined in claim 3, wherein said shutter system is a programmed shutter and said control means controls said actuator to cause programmed movement of said shutter blade according to exposure values.

5. The auxiliary drive system as defined in claim 3, wherein said control means controls said actuator so as to operate with a lower kinetic energy during movement of said shutter blade for running in than during movement of said shutter blade for making exposure.

6. The auxiliary drive system as defined in claim 4, wherein said control means controls said actuator so as to operate with a lower kinetic energy during movement of said shutter blade for running in than during movement of said shutter blade for making exposure.

7. An auxiliary drive system for a power-driven apparatus which has an actuator and movable members driven by the actuator, said auxiliary drive system comprising:
    timer means for counting a time since last movement of said movable members driven by said actuator; and
    control means for controlling said actuator to force said movable members to cause predetermined movement so as thereby to run in said movable members when said timer has counted a predetermined time since last movement of said movable members driven by said actuator.

8. The auxiliary drive system as defined in claim 7, wherein said control means further controls said actuator to force said movable members to cause said predetermined movement so as thereby to run in said movable members in response to loading the power-driven apparatus with a battery as a power source.

9. The auxiliary drive system as defined in claim 8, wherein said control means further controls said actuator to force said movable members to cause said predetermined movement so as thereby to run in said movable members in response to powering on the power-driven apparatus.

10. The auxiliary drive system as defined in claim 8, wherein said control means permits said actuator to force said movable members to cause said predetermined movement so as thereby to run in said movable members only while said power-driven apparatus is powered with battery power higher than a predetermined level.

11. The auxiliary drive system as defined in claim 8, wherein said power-driven apparatus comprises a shutter system having a shutter blade as said movable member which is driven by said actuator in response to shutter release to make exposure on a photographic film through movement from an initial position to a position beyond an opening position in which said shutter blade is on point of starting said exposure and return movement to said initial position, and said control means controls said actuator to force said shutter blade to cause predetermined back and forth movement between said initial position and a position before said opening position so as thereby to run in said shutter blade.

12. The auxiliary drive system as defined in claim 9, wherein said power-driven apparatus comprises a shutter system having a shutter blade as said movable member which is driven by said actuator in response to shutter release to make exposure on a photographic film through movement from an initial position to a position beyond an opening position in which said shutter blade is on point of starting said exposure and return movement to said initial position, and said control means controls said actuator to force said shutter blade to cause predetermined back and forth movement between said initial position and a position before said opening position so as thereby to run in said shutter blade.

13. The auxiliary drive system as defined in claim 7, wherein said control means further controls said actuator to force said movable members to cause said predetermined movement so as thereby to run in said movable members in response to powering on the power-drive in apparatus.

14. The auxiliary drive system as defined in claim 7, wherein said control means permits said actuator to force said movable members to cause said predetermined movement so as thereby to run in said movable members only while said power-driven apparatus is powered with battery power higher than a predetermined level.

15. The auxiliary drive system as defined in claim 7, wherein said power-driven apparatus comprises a shutter system having a shutter blade as said movable member which is driven by said actuator in response to shutter release to make exposure on a photographic film through movement from an initial position to a position beyond an opening position in which said shutter blade is on point of starting said exposure and return movement to said initial position, and said control means controls said actuator to force said shutter blade to cause predetermined back and forth movement between said initial position and a position before said opening position so as thereby to run in said shutter blade.

16. The auxiliary drive system as defined in claim 15, wherein said shutter system is a programmed shutter and said control means controls said actuator to cause programmed movement of said shutter blade according to exposure values.

17. The auxiliary drive system as defined in claim 15, wherein said control means controls said actuator so as to operate with a lower kinetic energy during movement of said shutter blade for running in than during movement of said shutter blade for making exposure.

18. The auxiliary drive system as defined in claim 16, wherein said control means controls said actuator so as to operate with a lower kinetic energy during movement of said shutter blade for running in than during movement of said shutter blade for making exposure.

19. An auxiliary drive system for a camera having a power-driven shutter system which comprises a n actuator and a shutter blade driven by the actuator to make exposure on a photographic film through movement of said shutter blade from an initial position to a position beyond an opening position in which said shutter blade is on point of starting said exposure and return movement of said shutter blade to said initial position, said auxiliary drive system comprising:
    control means for controlling said actuator to force said shutter blade to cause predetermined back and forth movement between said initial position and a position before said opening position so as thereby to run in said shutter blade in response to one of loading the camera with a battery as a power source and powering on the camera.

20. The auxiliary drive system as defined in claim 19, wherein said control means actuates said actuator in response to operation of a shutter release member of the camera.

21. The auxiliary drive system as defined in claim 19, wherein said shutter system is a programmed shutter and said control means controls said actuator to cause programmed movement of said shutter blade according to exposure values.

22. The auxiliary drive system as defined in claim 19, wherein said control means controls said actuator so as to operate with a lower kinetic energy during movement of said shutter blade for running in than during movement of said shutter blade for making exposure.

23. The auxiliary drive system as defined in claim 21, wherein said control means controls said actuator so as to operate with a lower kinetic energy during movement of said shutter blade for running in than during movement of said shutter blade for making exposure.

* * * * *